(12) United States Patent
Yamamoto

(10) Patent No.: US 11,223,931 B2
(45) Date of Patent: Jan. 11, 2022

(54) WIRELESS SENSOR SYSTEM, WIRELESS TERMINAL DEVICE, RELAY DEVICE, COMMUNICATION CONTROL METHOD, AND COMMUNICATION CONTROL PROGRAM

(71) Applicant: SUMITOMO ELECTRIC INDUSTRIES, LTD., Osaka (JP)

(72) Inventor: Takashi Yamamoto, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 51 days.

(21) Appl. No.: 16/652,489

(22) PCT Filed: Sep. 20, 2018

(86) PCT No.: PCT/JP2018/034705
§ 371 (c)(1),
(2) Date: Mar. 31, 2020

(87) PCT Pub. No.: WO2019/069690
PCT Pub. Date: Apr. 11, 2019

(65) Prior Publication Data
US 2020/0322761 A1    Oct. 8, 2020

(30) Foreign Application Priority Data
Oct. 6, 2017    (JP) .............................. JP2017-195975

(51) Int. Cl.
*H04W 4/38* (2018.01)
*H04W 72/04* (2009.01)
(Continued)

(52) U.S. Cl.
CPC ......... *H04W 4/38* (2018.02); *H04W 72/0453* (2013.01); *H04W 88/04* (2013.01); *H04W 84/18* (2013.01)

(58) Field of Classification Search
CPC ... H04W 4/38; H04W 72/0453; H04W 88/04; H04W 84/18; H04W 4/70; H04W 4/06;
(Continued)

(56) References Cited

U.S. PATENT DOCUMENTS

2010/0260240 A1* 10/2010 Wang ..................... H04B 7/026
375/214
2012/0155301 A1* 6/2012 Miyazaki .............. H04W 28/06
370/252
(Continued)

FOREIGN PATENT DOCUMENTS

JP    2011-087220 A    4/2011
JP    2012-114661 A    6/2012
(Continued)

OTHER PUBLICATIONS

"Ad hoc;" Wikipedia; 2015; searched Aug. 16, 2017; http://ja.wikipedia.org/ad hoc.

*Primary Examiner* — Hassan Kizou
*Assistant Examiner* — Abdullahi Ahmed
(74) *Attorney, Agent, or Firm* — Oliff PLC

(57) ABSTRACT

This wireless sensor system includes: one or a plurality of wireless terminal devices, each wireless terminal device being configured to transmit data including sensor information indicating a result of measurement by a sensor; a management device; and one or a plurality of relay devices, each relay device being configured to transmit the data received from the wireless terminal device, to the management device or another relay device. The wireless terminal device transmits, through one-way communication, a radio signal including the data and being in a first frequency band. The relay device transmits a radio signal including the data and being in a second frequency band partially or entirely different from the first frequency band.

14 Claims, 19 Drawing Sheets

(51) Int. Cl.
*H04W 88/04* (2009.01)
*H04W 84/18* (2009.01)

(58) Field of Classification Search
CPC . H04W 4/00; H04B 7/15542; H04Q 2209/40; H04L 67/2814; H04L 67/32
See application file for complete search history.

(56) References Cited

U.S. PATENT DOCUMENTS

| | | | |
|---|---|---|---|
| 2013/0021167 A1* | 1/2013 | Harper, Jr. | G05B 9/02 |
| | | | 340/870.01 |
| 2014/0128118 A1* | 5/2014 | Tomimatsu | H04Q 9/00 |
| | | | 455/517 |
| 2014/0293801 A1* | 10/2014 | Dimou | H04W 84/18 |
| | | | 370/252 |
| 2017/0008162 A1* | 1/2017 | Tsubota | G05B 19/00 |
| 2017/0345297 A1 | 11/2017 | Umehara et al. | |
| 2018/0324067 A1* | 11/2018 | Okayama | H04L 43/065 |
| 2019/0036772 A1* | 1/2019 | Agerstam | H04W 4/70 |
| 2019/0268817 A1* | 8/2019 | Seo | H04W 84/047 |

FOREIGN PATENT DOCUMENTS

| | | |
|---|---|---|
| JP | 2013-516915 A | 5/2013 |
| JP | 2015-053593 A | 3/2015 |
| JP | 2015-104008 A | 6/2015 |
| JP | 2015-188140 A | 10/2015 |
| JP | 2015-192269 A | 11/2015 |
| JP | 2016-167199 A | 9/2016 |
| JP | 2016-187076 A | 10/2016 |
| JP | 2017-028434 A | 2/2017 |
| WO | 2011/085149 A2 | 7/2011 |

* cited by examiner

FIG. 5

| 8 | 1 | 1 | 1 | 2 | UNIT: OCTET |
|---|---|---|---|---|---|
| LONG SENSOR ID | SOFTWARE VERSION | SEQUENCE NUMBER | BATTERY VOLTAGE VALUE | SENSOR MEASUREMENT VALUE | |

LSD

FIG. 6

| SHORT SENSOR ID | SEQUENCE NUMBER | SENSOR MEASUREMENT VALUE |
|---|---|---|
| 3 | 1 | 2 |

SSD

UNIT: OCTET

FIG. 10

| 1 | 1 | VARIABLE | | VARIABLE |
|---|---|---|---|---|
| DESTINATION ID | TRANSMISSION SOURCE ID | SENSOR DATA | ·········· | SENSOR DATA |

UNIT: OCTET

WIRELESS SENSOR SYSTEM, WIRELESS TERMINAL DEVICE, RELAY DEVICE, COMMUNICATION CONTROL METHOD, AND COMMUNICATION CONTROL PROGRAM

TECHNICAL FIELD

The present invention relates to a wireless sensor system, a wireless terminal device, a relay device, a communication control method, and a communication control program.

The present application claims priority based on Japanese Patent Application No. 2017-195975 filed on Oct. 6, 2017, the entire contents of which are incorporated herein by reference.

BACKGROUND ART

"Wikipedia" [online], [searched on Aug. 16, 2017] on the Internet <URL:http://ja.wikipedia.org/ad hoc> (NON PATENT LITERATURE 1) describes a wireless ad hoc network. That is, in mobile communication used in mobile phones and the like, wireless base station devices and infrastructures such as fixed networks that connect wireless base station devices are indispensable. Meanwhile, in a wireless ad hoc network, each wireless terminal device autonomously performs routing to perform multi-hop communication. The wireless ad hoc network does not require a fixed network, and essentially, does not require such infrastructures. Therefore, simply by distributing wireless terminal devices in an environment in which to construct a network, and providing a state where the wireless terminal devices gather, the network can be constructed immediately.

CITATION LIST

Patent Literature

PATENT LITERATURE 1: Japanese Laid-Open Patent Publication No. 2015-53593

Non Patent Literature

NON PATENT LITERATURE 1: "Wikipedia", [online], [searched on Aug. 16, 2017] on the Internet <URL:http://ja.wikipedia.org/ad hoc>

SUMMARY OF INVENTION (1) A wireless sensor system of the present disclosure includes: one or a plurality of wireless terminal devices, each wireless terminal device being configured to transmit data including sensor information indicating a result of measurement by a sensor; a management device; and one or a plurality of relay devices, each relay device being configured to transmit the data received from the wireless terminal device, to the management device or another relay device. The wireless terminal device transmits, through one-way communication, a radio signal including the data and being in a first frequency band. The relay device transmits a radio signal including the data and being in a second frequency band partially or entirely different from the first frequency band.

(13) A wireless terminal device of the present disclosure includes: a creation unit configured to create data including sensor information indicating a result of measurement by a sensor; and a transmission unit configured to transmit, through one-way communication, a radio signal including the data. A frequency band for the radio signal transmitted by the transmission unit is partially or entirely different from a frequency band for a radio signal transmitted by a relay device configured to relay the data received from the wireless terminal device.

(14) A relay device of the present disclosure includes: a reception unit configured to receive data including sensor information indicating a result of measurement by a sensor, the data having been transmitted from a wireless terminal device through one-way communication; and a transmission unit configured to transmit a radio signal including the data received by the reception unit, to another device. A frequency band for the radio signal transmitted by the transmission unit is partially or entirely different from a frequency band for a radio signal including the data transmitted by the wireless terminal device.

(15) A communication control method of the present disclosure is to be performed in a wireless sensor system. The wireless sensor system includes: one or a plurality of wireless terminal devices, each wireless terminal device being configured to transmit data including sensor information indicating a result of measurement by a sensor; a management device; and one or a plurality of relay devices, each relay device being configured to transmit the data received from the wireless terminal device, to the management device or another relay device. The communication control method includes the steps of: transmitting through one-way communication, by the wireless terminal device, a radio signal including the data and being in a first frequency band; and transmitting, by the relay device, a radio signal including the data and being in a second frequency band partially or entirely different from the first frequency band.

(16) A communication control program of the present disclosure is to be used in a wireless terminal device. The communication control program causes a computer to function as: a creation unit configured to create data including sensor information indicating a result of measurement by a sensor; and a transmission unit configured to transmit, through one-way communication, a radio signal including the data. A frequency band for the radio signal transmitted by the transmission unit is partially or entirely different from a frequency band for a radio signal transmitted by a relay device configured to relay the data received from the wireless terminal device.

(17) A communication control program of the present disclosure is to be used in a relay device. The communication control program causes a computer to function as: a reception unit configured to receive data including sensor information indicating a result of measurement by a sensor, the data having been transmitted from a wireless terminal device through one-way communication; and a transmission unit configured to transmit a radio signal including the data received by the reception unit, to another device. A frequency band for the radio signal transmitted by the transmission unit is partially or entirely different from a frequency band for a radio signal including the data transmitted by the wireless terminal device.

One mode of the present disclosure can be realized as a wireless sensor system that includes such a characteristic processing unit, and can also be realized as a semiconductor integrated circuit that realizes a part of or the entire wireless sensor system.

One mode of the present disclosure can be realized as a wireless terminal device that includes such a characteristic processing unit, and can also be realized as a method that includes such characteristic processes as steps. One mode of the present disclosure can be realized as a semiconductor integrated circuit that realizes a part of or the entire wireless terminal device.

One mode of the present disclosure can be realized as a relay device that includes such a characteristic processing unit, and can also be realized as a method that includes such characteristic processes as steps. One mode of the present disclosure can be realized as a semiconductor integrated circuit that realizes a part of or the entire relay device.

BRIEF DESCRIPTION OF DRAWINGS

FIG. 5 shows an example of long sensor data created by a data creation unit of the sensor module according to the embodiment of the present disclosure.

FIG. 6 shows an example of short sensor data created by the data creation unit of the wireless terminal device according to the embodiment of the present disclosure.

FIG. 10 shows an example of aggregated data created by a higher-order-side communication processing unit of the relay device according to the embodiment of the present disclosure.

DESCRIPTION OF EMBODIMENTS

Figure 1:
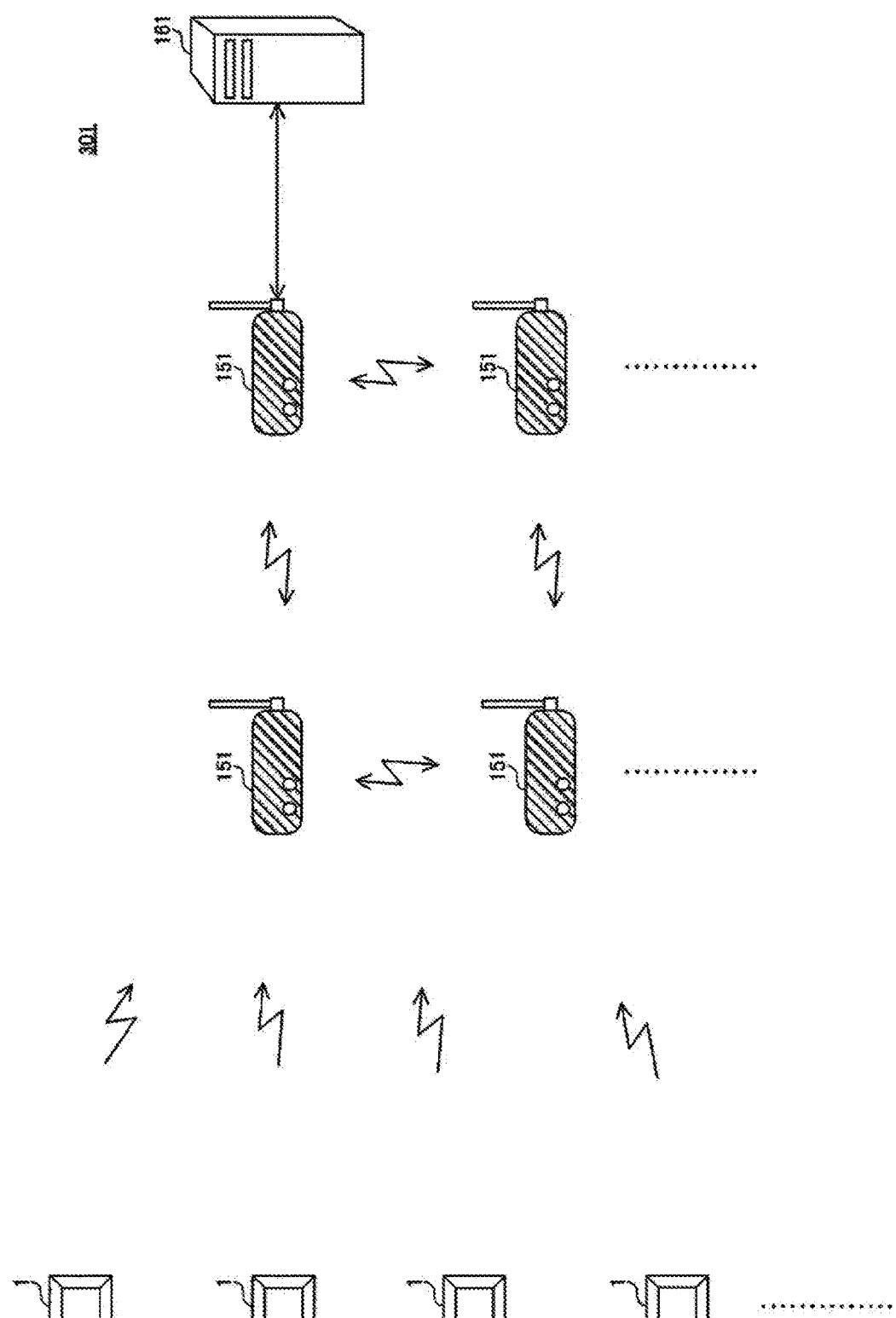
FIG. 1 shows a configuration of a wireless sensor system according to an embodiment of the present disclosure.

Problems to be Solved by the Present Disclosure

When a packet is communicated between communication devices via a wireless ad hoc network, the packet is transmitted between the communication devices through a transmission path via one or a plurality of relay devices that relay the packet.

Such multi-hop communication is used not only in a wireless ad hoc network but also in a wired network, and is often used by a single application such as a smart meter for measuring electric power, for example.

In contrast to this, in an M2M (Machine to Machine) system expected to be increasingly used in the future, a configuration is conceivable in which a management device aggregates results of measurements by sensors. In such a configuration, a packet transmitted from a wireless terminal device is transmitted to the management device via one or a plurality of relay devices.

For example, when a large number of wireless terminal devices and relay devices are provided, data loss is increased due to radio-frequency interference between wireless communication devices and relay devices. Thus, it is required to identify the cause for such interference and remove the interference. However, identifying the cause requires elaborate investigations, which results in a lot of work. A technology is required that can reliably transmit data even when a large number of wireless terminal devices and relay devices are provided in a wireless communication network.

The present disclosure has been made in order to solve the above problem. An object of the present disclosure is to provide a wireless sensor system, a wireless terminal device, a relay device, a communication control method, and a communication control program that allow reliable transmission of data in a configuration in which data is transmitted from a wireless terminal device via a relay device.

Effects of the Present Disclosure

According to the present disclosure, in a configuration in which data is transmitted from a wireless terminal device via a relay device, the data can be reliably transmitted.

Description of Embodiment of the Present Disclosure

First, contents of an embodiment of the present disclosure are listed and described.

(1) A wireless sensor system according to an embodiment of the present disclosure includes: one or a plurality of wireless terminal devices, each wireless terminal device being configured to transmit data including sensor information indicating a result of measurement by a sensor; a management device; and one or a plurality of relay devices, each relay device being configured to transmit the data received from the wireless terminal device, to the management device or another relay device. The wireless terminal device transmits, through one-way communication, a radio signal including the data and being in a first frequency band. The relay device transmits a radio signal including the data and being in a second frequency band partially or entirely different from the first frequency band.

In this configuration, the first frequency band used by the wireless terminal device in transmitting a radio signal and the second frequency band used by the relay device in transmitting a radio signal are different from each other. Therefore, even in a wireless sensor system in which time division multiple access cannot be used because the wireless terminal device performs one-way communication and thus time synchronization between the wireless terminal device and the relay device is difficult, it is possible to suppress radio-frequency interference between the relay device and the wireless terminal device. Accordingly, even when a large number of wireless terminal devices and relay devices are provided without performing elaborate investigation, increase in data loss due to interference can be prevented. Therefore, in a configuration in which data is transmitted from a wireless terminal device via a relay device, the data can be reliably transmitted.

(2) Preferably, the wireless terminal device transmits a plurality of data that include the sensor information having an identical content, within a transmission cycle of the data transmitted by the relay device.

Even in a configuration in which the first frequency band and the second frequency band are different from each other, a radio signal transmitted by a relay device sometimes includes a component in the first frequency band, for example. In such a case, if the relay device is to receive a radio signal from a wireless terminal device in a period in which the relay device is transmitting a radio signal, the relay device may fail in receiving the radio signal from the wireless terminal device. With the above-described configuration, the possibility of failing in all receptions of the plurality of data from the wireless terminal device due to interference can be reduced. Thus, loss of sensor information can be inhibited.

(3) Preferably, the wireless terminal device transmits a plurality of data that include the sensor information having an identical content, so as to be separated from each other by not less than a transmission time period of the data transmitted by the relay device.

Even in a configuration in which the first frequency band and the second frequency band are different from each other, a radio signal transmitted by the relay device sometimes includes a component in the first frequency band, for example. In such a case, if the relay device is to receive a radio signal from a wireless terminal device in a period in which the relay device is transmitting a radio signal, the relay device may fail in receiving the radio signal from the wireless terminal device. With the above-described configuration, it is possible to reduce the possibility of consecutively failing in receiving the plurality of data from the wireless terminal device. Thus, loss of sensor information can be inhibited.

(4) More preferably, the relay device is capable of transmitting, in an aggregated manner, the data received from a plurality of the wireless terminal devices. Each wireless terminal device transmits a plurality of data that include the sensor information having an identical content, so as to be separated from each other by not less than a transmission time period of the data having been aggregated by the relay device.

Thus, in the configuration in which communication traffic can be reduced by transmitting, in an aggregated manner, data received from a plurality of wireless terminal devices, it is possible to reduce the possibility of consecutively failing in receiving the plurality of data from each wireless terminal device. Thus, loss of sensor information can be inhibited.

(5) More preferably, the transmission cycle is variable, and the wireless terminal device transmits a plurality of data that include the sensor information having an identical content, within the transmission cycle at a minimum value thereof.

With this configuration, the wireless terminal device can transmit, at least twice, data that include sensor information having an identical content, within the transmission cycle. Thus, it is possible to further reduce the possibility that the relay device fails in all receptions of the plurality of data from the wireless terminal device due to interference.

(6) More preferably, the wireless terminal device transmits, in a second transmission after a first transmission, a plurality of data that are obtained by deleting a part or an entirety of data other than the sensor information in a plurality of data transmitted in the first transmission and that include new sensor information.

With this configuration, the amount of data transmitted in the second transmission can be reduced. Thus, power consumption in the wireless terminal device can be suppressed. In addition, since the transmission period of each device in the wireless sensor system can be shortened, increase in data loss due to interference can be prevented.

(7) Preferably, a plurality of the relay devices are able to receive the radio signal transmitted from an identical wireless terminal device, and the respective relay devices are set to transmit the radio signals including the data so as not to overlap each other in terms of time.

Since the distance between a plurality of relay devices that are able to receive a radio signal transmitted from an identical wireless terminal device is short, there is a high possibility that interference occurs between the relay devices. With the above-described configuration, occurrence of interference between the plurality of relay devices can be prevented. Thus, increase in data loss due to interference can be prevented.

(8) More preferably, each relay device is capable of determining whether or not another relay device is transmitting a radio signal, and is capable of determining whether or not the other relay device is receiving a radio signal transmitted from the wireless terminal device, and each wireless terminal device is capable of determining whether or not another wireless terminal device is transmitting a radio signal.

Causing a wireless terminal device to have a function of being able to determine whether or not a relay device is transmitting a radio signal requires costs. With the above-described configuration, for example, in a case where a relay device receives data from a plurality of wireless terminal devices, the possibility of succeeding in all data receptions can be increased. In addition, for example, in a case where a plurality of relay devices simultaneously receive data from one wireless terminal device, the possibility that all the relay devices succeed in receiving the data can be increased.

(9) More preferably, the wireless terminal device from which a single relay device is able to receive the radio signal transmits a plurality of data that include the sensor information having an identical content, within a transmission cycle of the data transmitted by the relay device.

With this configuration, one relay device can be provided or a plurality of relay devices can be provided, in accordance with whether or not the wireless terminal device has a function of transmitting a plurality of data that include sensor information having an identical content, within the transmission cycle. Accordingly, increase in data loss due to interference can be prevented.

(10) Preferably, the relay device is capable of resending the data to another relay device or the management device.

With this configuration, the data can be more reliably transmitted in the wireless sensor system.

(11) Preferably, when a predetermined condition is satisfied, the relay device thins the data and transmits the resultant data.

With this configuration, the transmission period for the relay device can be shortened. Thus, increase in data loss due to interference can be prevented.

(12) Preferably, the relay device includes a plurality of antennas, and is capable of receiving the data through each antenna.

Thus, if the configuration in which the relay device can receive data through a plurality of antennas is combined with settings of transmission frequencies of the wireless terminal device and the relay device, it is possible to effectively make up for the weakness that data loss tends to occur because the wireless terminal device performs one-way communication. Therefore, in accordance with increase in the number of relay devices, the reception performance of radio signals in the entire wireless sensor system is improved, and the data can be more reliably transmitted.

(13) A wireless terminal device according to an embodiment of the present disclosure includes: a creation unit configured to create data including sensor information indicating a result of measurement by a sensor; and a transmission unit configured to transmit, through one-way communication, a radio signal including the data. A frequency band for the radio signal transmitted by the transmission unit is partially or entirely different from a frequency band for a radio signal transmitted by a relay device configured to relay the data received from the wireless terminal device.

In this configuration, the frequency band used by the transmission unit in transmitting a radio signal and the frequency band used by the relay device in transmitting a radio signal are different from each other. Therefore, even in a wireless sensor system in which time division multiple access cannot be used because the wireless terminal device performs one-way communication and thus time synchronization between the wireless terminal device and the relay device is difficult, it is possible to suppress radio-frequency interference between the relay device and the wireless terminal device. Accordingly, even when a large number of wireless terminal devices and relay devices are provided without performing elaborate investigation, increase in data loss due to interference can be prevented. Therefore, in a configuration in which data is transmitted from a wireless terminal device via a relay device, the data can be reliably transmitted.

(14) A relay device according to an embodiment of the present disclosure includes: a reception unit configured to receive data including sensor information indicating a result of measurement by a sensor, the data having been transmitted from a wireless terminal device through one-way communication; and a transmission unit configured to transmit a radio signal including the data received by the reception unit, to another device. A frequency band for the radio signal transmitted by the transmission unit is partially or entirely different from a frequency band for a radio signal including the data transmitted by the wireless terminal device.

In this configuration, the frequency band used by the transmission unit in transmitting a radio signal and the frequency band used by the wireless terminal device in transmitting a radio signal are different from each other. Therefore, even in a wireless sensor system in which time division multiple access cannot be used because the wireless terminal device performs one-way communication and thus time synchronization between the wireless terminal device and the relay device is difficult, it is possible to suppress radio-frequency interference between the relay device and the wireless terminal device. Accordingly, even when a large number of wireless terminal devices and relay devices are provided without performing elaborate investigation, increase in data loss due to interference can be prevented. Therefore, in a configuration in which data is transmitted from a wireless terminal device via a relay device, the data can be reliably transmitted.

(15) A communication control method according to an embodiment of the present disclosure is to be performed in a wireless sensor system. The wireless sensor system includes: one or a plurality of wireless terminal devices, each wireless terminal device being configured to transmit data including sensor information indicating a result of measurement by a sensor; a management device; and one or a plurality of relay devices, each relay device being configured to transmit the data received from the wireless terminal device, to the management device or another relay device. The communication control method includes the steps of: transmitting through one-way communication, by the wireless terminal device, a radio signal including the data and being in a first frequency band; and transmitting, by the relay device, a radio signal including the data and being in a second frequency band partially or entirely different from the first frequency band.

In this configuration, the first frequency band used by the wireless terminal device in transmitting a radio signal and the second frequency band used by the relay device in transmitting a radio signal are different from each other. Therefore, even in a wireless sensor system in which time division multiple access cannot be used because the wireless terminal device performs one-way communication and thus time synchronization between the wireless terminal device and the relay device is difficult, it is possible to suppress radio-frequency interference between the relay device and the wireless terminal device. Accordingly, even when a large number of wireless terminal devices and relay devices are provided without performing elaborate investigation, increase in data loss due to interference can be prevented. Therefore, in a configuration in which data is transmitted from a wireless terminal device via a relay device, the data can be reliably transmitted.

(16) A communication control program according to an embodiment of the present disclosure is to be used in a wireless terminal device. The communication control program causes a computer to function as: a creation unit configured to create data including sensor information indicating a result of measurement by a sensor; and a transmission unit configured to transmit, through one-way communication, a radio signal including the data. A frequency band for the radio signal transmitted by the transmission unit is partially or entirely different from a frequency band for a radio signal transmitted by a relay device configured to relay the data received from the wireless terminal device.

In this configuration, the frequency band used by the transmission unit in transmitting a radio signal and the frequency band used by the relay device in transmitting a radio signal are different from each other. Therefore, even in a wireless sensor system in which time division multiple access cannot be used because the wireless terminal device performs one-way communication and thus time synchronization between the wireless terminal device and the relay device is difficult, it is possible to suppress radio-frequency interference between the relay device and the wireless terminal device. Accordingly, even when a large number of wireless terminal devices and relay devices are provided without performing elaborate investigation, increase in data loss due to interference can be prevented. Therefore, in a configuration in which data is transmitted from a wireless terminal device via a relay device, the data can be reliably transmitted.

(17) A communication control program according to an embodiment of the present disclosure is to be used in a relay device. The communication control program causes a computer to function as: a reception unit configured to receive data including sensor information indicating a result of measurement by a sensor, the data having been transmitted from a wireless terminal device through one-way communication; and a transmission unit configured to transmit a radio signal including the data received by the reception unit, to another device. A frequency band for the radio signal transmitted by the transmission unit is partially or entirely different from a frequency band for a radio signal including the data transmitted by the wireless terminal device.

In this configuration, the frequency band used by the transmission unit in transmitting a radio signal and the frequency band used by the wireless terminal device in transmitting a radio signal are different from each other. Therefore, even in a wireless sensor system in which time division multiple access cannot be used because the wireless terminal device performs one-way communication and thus time synchronization between the wireless terminal device and the relay device is difficult, it is possible to suppress radio-frequency interference between the relay device and the wireless terminal device. Accordingly, even when a large number of wireless terminal devices and relay devices are provided without performing elaborate investigation, increase in data loss due to interference can be prevented. Therefore, in a configuration in which data is transmitted from a wireless terminal device via a relay device, the data can be reliably transmitted.

Hereinafter, embodiments of the present disclosure will be described with reference to the drawings. In the drawings, the same or corresponding parts are denoted by the same reference signs, and descriptions thereof are not repeated. At least some parts of the embodiments described below can be combined together as desired.

[Configuration and Basic Operation]

FIG. 1 shows a configuration of a wireless sensor system according to an embodiment of the present disclosure.

With reference to FIG. 1, a wireless sensor system 301 includes a plurality of sensor modules 1, a plurality of relay devices 151, and a management device 161.

Not limited to the configuration in which the wireless sensor system 301 includes a plurality of sensor modules 1, the wireless sensor system 301 may be provided with a single sensor module 1. In addition, not limited to the configuration in which the wireless sensor system 301 includes a plurality of relay devices 151, the wireless sensor system 301 may be provided with a single relay device 151.

The relay device 151 is an access point, for example. The management device 161 is a server, for example.

The sensor module 1 operates using electric power from a battery, for example. The relay device 151 and the management device 161 operate using electric power from a power system, for example.

In the wireless sensor system 301, the plurality of relay devices 151 relay information transmitted from the sensor modules 1 to the management device 161.

Communication between a sensor module 1 and a relay device 151 is performed through one-way wireless communication. Communication between relay devices 151 is performed through wireless multi-hop communication.

Communication between the management device 161 and a relay device 151 is performed through wired communication, for example. Communication between the management device 161 and a relay device 151 may be performed through wireless communication.

For example, when the wireless sensor system 301 is used in an M2M system, the plurality of relay devices 151 relay sensor information indicating a result of measurement of a sensor module 1 including a sensor, to transmit the sensor information to the management device 161.

[Problem]

Figure 2:
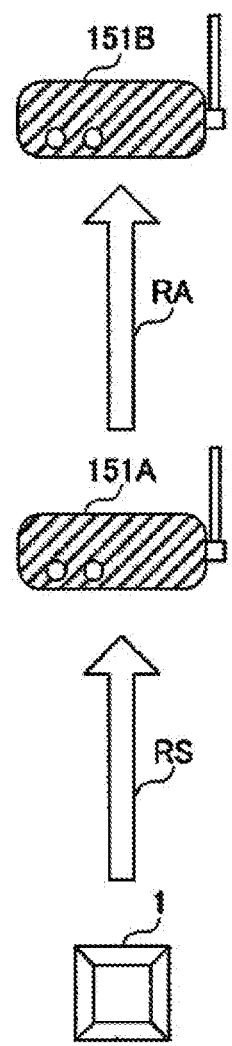
FIG. 2 illustrates interference that occurs in the wireless sensor system according to the embodiment of the present disclosure.

FIG. 2 illustrates interference that occurs in the wireless sensor system according to the embodiment of the present disclosure.

With reference to FIG. 2, a situation is assumed in which relay devices 151A, 151B, which are the relay devices 151, and a sensor module 1 are provided.

The relay device 151 and the sensor module 1 each use a radio signal in a 920 megahertz band, for example. In the 920 megahertz band, a plurality of channels are set according to a predetermined communication standard, for example.

In this example, the relay device 151A and the sensor module 1 simultaneously transmit radio signals in channels that are different from each other.

More specifically, a radio signal RA transmitted from the relay device 151A includes a packet of which the destination is a relay device 151B, for example.

A radio signal RS transmitted from the sensor module 1 includes a packet that should be received and relayed by the relay device 151A, for example.

The radio signal RA transmitted from the relay device 151A sometimes includes a frequency component in a channel (hereinafter, also referred to as terminal channel) used by the sensor module 1, for example.

In the relay device 151A, a transmission unit which transmits the radio signal RA and a reception unit which receives the radio signal RS are close to each other. Thus, a component in the terminal channel included in the radio signal RS and a component in the terminal channel included in the radio signal RA interfere with each other. This makes it difficult to accurately perform signal processing of the received signal based on the radio signal RS.

In contrast to this, for example, as disclosed in PATENT LITERATURE 1 (Japanese Laid-Open Patent Publication No. 2015-53593), a method is conceivable in which a time slot in which the relay device 151A transmits a radio signal RA, and a time slot in which the sensor module 1 transmits a radio signal RS are set to be different from each other.

However, the sensor module 1, which operates using the power from a battery, has a simple configuration in which a reception function is not provided. Thus, a process of performing time synchronization with a relay device 151 is difficult to be performed. It is also difficult to provide a high accuracy clock.

Therefore, the wireless sensor system according to the embodiment of the present disclosure solves such a problem, through the configurations and operations described below.

[Transmission Timing for Relay Device 151]

Figure 3:
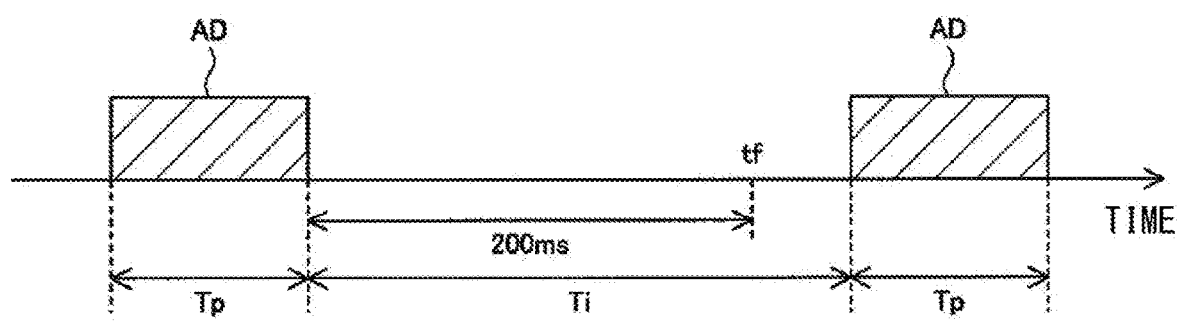
FIG. 3 shows an example of a schedule in which a relay device in the wireless sensor system according to the embodiment of the present disclosure transmits sensor data.

FIG. 3 shows an example of a schedule in which a relay device in the wireless sensor system according to the embodiment of the present disclosure transmits sensor data.

With reference to FIG. 3, for example, a relay device 151 receives sensor data from a sensor module 1, and creates aggregated data AD on the basis of the received sensor data. In a transmission period Tp, the relay device 151 transmits the aggregated data AD to another relay device 151 or the management device 161. Details of the sensor data and the aggregated data AD will be described later.

The length of the transmission period Tp is 20 milliseconds at maximum, for example. When the relay device 151 has failed in transmitting the aggregated data AD within 20 milliseconds, the relay device 151 transmits, in the next transmission period Tp, the data that was not able to be transmitted.

For example, the transmission cycle of data transmitted by the relay device 151 is variable. More specifically, a standby period Ti is provided between the completion timing of a transmission period Tp and the start timing of the next transmission period Tp. The length of the standby period Ti is the sum of 200 milliseconds and a backoff time, which is set at random and of which the upper limit is 20 milliseconds, for example. Details of the backoff time will be described later.

[Configuration of Sensor Module 1]

Figure 4:
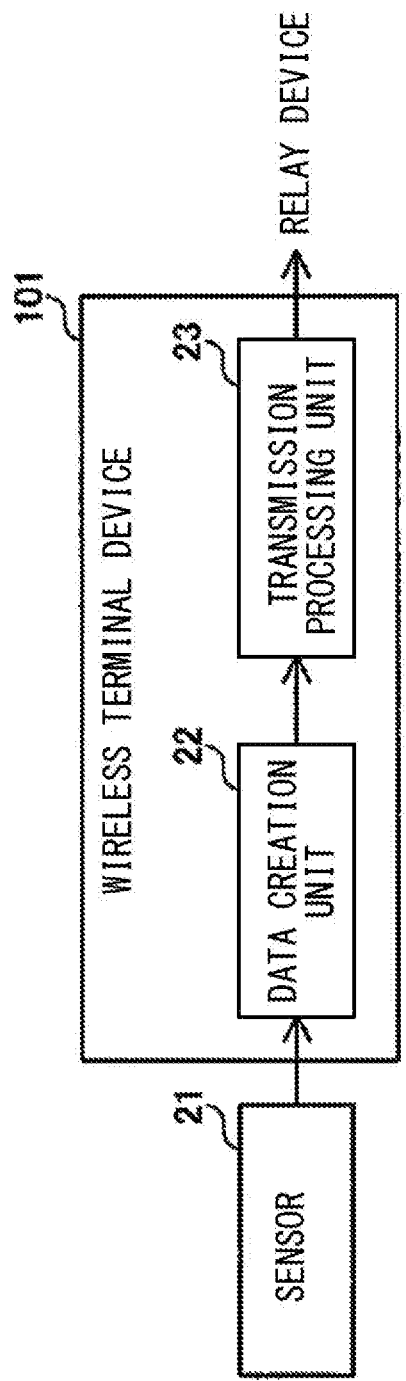
FIG. 4 shows a configuration of a sensor module in the wireless sensor system according to the embodiment of the present disclosure.

FIG. 4 shows a configuration of the sensor module in the wireless sensor system according to the embodiment of the present disclosure.

With reference to FIG. 4, the sensor module 1 includes a sensor 21 and a wireless terminal device 101. The wireless terminal device 101 includes a data creation unit 22, and a transmission processing unit (transmission unit) 23.

The sensor 21 in the sensor module 1 measures at least one of physical quantities such as temperature, humidity, current, acceleration, gyro value, and pressure, for example, and transmits an analog signal indicating the measured physical quantity, to the data creation unit 22.

The sensor 21 has a unique ID having a size of 64 octets (hereinafter, also referred to as long sensor ID), for example.

FIG. 5 shows an example of long sensor data created by the data creation unit of the sensor module according to the embodiment of the present disclosure.

With reference to FIG. 5 the data creation unit 22 creates sensor data including sensor information indicating a result of measurement by the sensor 21.

Specifically, the data creation unit 22 creates long sensor data LSD and short sensor data SSD, which are examples of the sensor data.

More specifically, the data creation unit 22 receives an analog signal from the sensor 21, and performs AD conversion on the received analog signal, thereby generating a sensor measurement value.

The data creation unit 22 acquires a voltage value of the battery that is used as a power supply for the wireless terminal device 101 to which the data creation unit 22 belongs.

The data creation unit 22 creates long sensor data LSD that includes a long sensor ID of the corresponding sensor 21, a version of software in the wireless terminal device 101 to which the data creation unit 22 belongs, a sequence number, the acquired battery voltage value, and the generated sensor measurement value.

FIG. 6 shows an example of short sensor data created by the data creation unit of the wireless terminal device according to the embodiment of the present disclosure.

With reference to FIG. 6, the data creation unit 22 creates short sensor data SSD that includes a short sensor ID based on the long sensor ID of the corresponding sensor 21, the sequence number, and the generated sensor measurement value.

Specifically, the value of the short sensor ID is the value of low-order 3 octets of the value of the above-mentioned long sensor ID, for example.

Hereinafter, each of the long sensor ID and the short sensor ID will also be referred to as a sensor ID.

Here, the sequence number and the sensor measurement value correspond to each other. In other words, sensor data that include an identical sequence number include an identical sensor measurement value.

Figure 7:
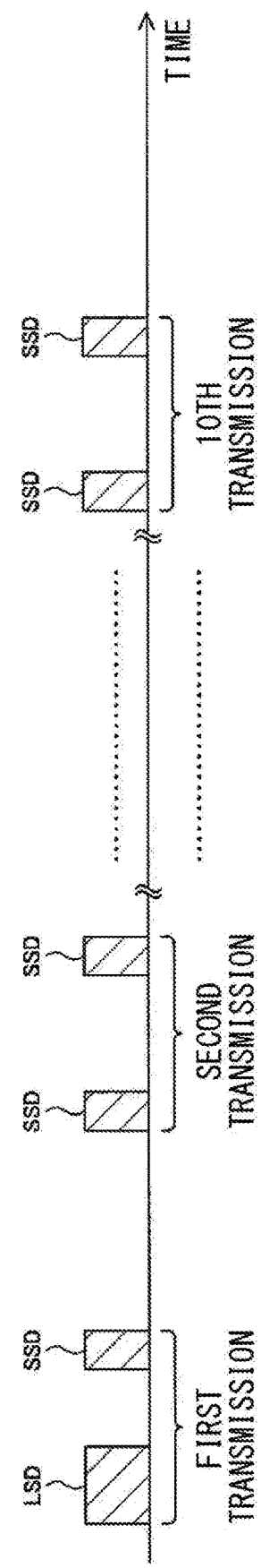
FIG. 7 shows an example of a sequence of transmission of sensor data performed by the wireless terminal device according to the embodiment of the present disclosure.

FIG. 7 shows an example of a sequence of transmission of sensor data performed by the wireless terminal device according to the embodiment of the present disclosure.

With reference to FIG. 7, for example, in the second transmission after the first transmission, the wireless terminal device 101 transmits, as sensor data, a plurality of data that are obtained by deleting a part of data other than sensor information in a plurality of sensor data transmitted in the first transmission and that include new sensor information. That is, the wireless terminal device 101 performs transmission in a consecutive manner.

Specifically, assuming that 10 transmissions form one sequence, the wireless terminal device 101 repeats the sequence.

More specifically, in the first transmission, for example, the data creation unit 22 of the wireless terminal device 101 creates long sensor data LSD and short sensor data SSD. The long sensor data LSD and the short sensor data SSD include an identical sequence number, an identical battery voltage value, and an identical sensor measurement value. The value of the short sensor ID included in the short sensor data SSD is a value based on the long sensor ID included in the long sensor data LSD.

Hereinafter, the relationship between the long sensor data LSD and the short sensor data SSD will also be referred to as brother relationship.

For example, in each of the second transmission to the 10th transmission, the data creation unit 22 creates two identical short sensor data SSD. Hereinafter, the relationship between the two short sensor data SSD will also be referred to as twin relationship.

Figure 8:
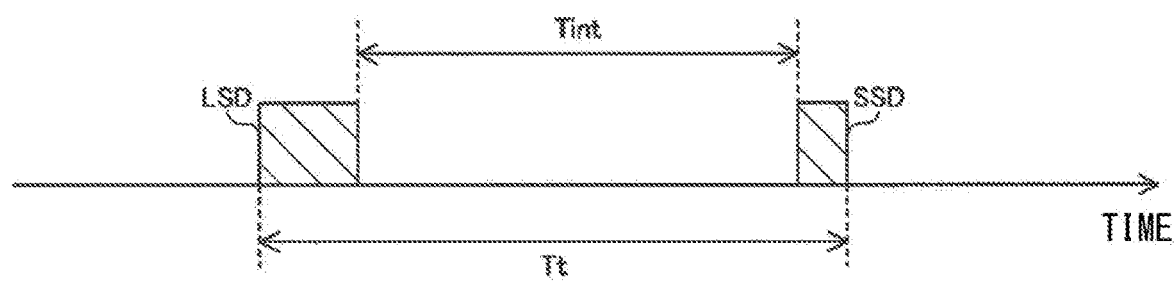
FIG. 8 shows an example of timings at which the wireless terminal device according to the embodiment of the present disclosure transmits sensor data.

FIG. 8 shows an example of timings at which the wireless terminal device according to the embodiment of the present disclosure transmits sensor data.

With reference to FIG. 8, for example, the wireless terminal device 101 transmits a plurality of sensor data that include sensor information having an identical content, within a transmission cycle of aggregated data AD transmitted by the relay device 151, i.e., within the standby period Ti (see FIG. 3).

More specifically, for example, the wireless terminal device 101 transmits two sensor data that include sensor information having an identical content, within the transmission cycle at a minimum value thereof, here, 200 milliseconds.

In addition, for example, the wireless terminal device 101 transmits a plurality of sensor data that include sensor information having an identical content, so as to be separated from each other by not less than the length of a transmission time period of aggregated data AD aggregated by the relay device 151, i.e., the transmission period Tp (see FIG. 3).

Here, transmission timings of long sensor data LSD and short sensor data SSD in the first transmission are described. However, the same applies to the transmission timings of two short sensor data SSD having the twin relationship in the second transmission to the 10th transmission.

Specifically, a time period Tt, which is from the transmission start timing of the long sensor data LSD to the transmission end timing of the short sensor data SSD, is not greater than 200 milliseconds.

In addition, a time period Tint, which is from the transmission end timing of the long sensor data LSD to the transmission start timing of the short sensor data SSD, has a length not less than the length of the transmission period Tp.

With reference to FIG. 4 again, the data creation unit 22 creates sensor data in accordance with the timings shown in FIG. 7 and FIG. 8, and outputs the created sensor data to the transmission processing unit 23.

The transmission processing unit 23 transmits, through one-way communication, a radio signal including the sensor data and being in a first frequency band.

For example, the transmission processing unit 23 is capable of determining whether or not another wireless terminal device 101 is transmitting a radio signal.

Specifically, the transmission processing unit 23 transmits a radio signal including sensor data, in accordance with a CSMA/CA (Carrier Sense Multiple Access/Collision Avoidance) method, for example.

More specifically, the above-described terminal channel in a 920 megahertz band is set in the transmission processing unit 23 by a user, for example.

When the transmission processing unit 23 has received sensor data from the data creation unit 22, the transmission processing unit 23 performs carrier sensing regarding the terminal channel, for example.

As a result of the carrier sensing, when the transmission processing unit 23 has confirmed that another sensor module 1 is not transmitting a radio signal, the transmission processing unit 23 broadcasts a radio signal including the sensor data.

[Configuration of Relay Device 151]

Figure 9:
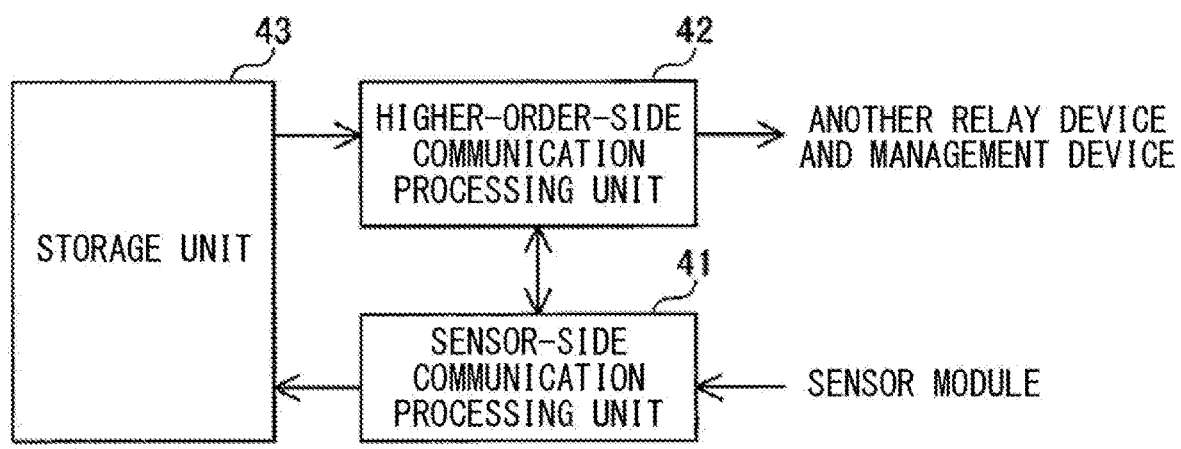
FIG. 9 shows a configuration of the relay device in the wireless sensor system according to the embodiment of the present disclosure.

FIG. 9 shows a configuration of the relay device in the wireless sensor system according to the embodiment of the present disclosure.

With reference to FIG. 9, the relay device 151 includes a sensor-side communication processing unit (reception unit) 41, a higher-order-side communication processing unit (transmission unit) 42, and a storage unit 43.

The relay device 151 transmits sensor data received from the wireless terminal device 101, to the management device 161 or another relay device 151.

More specifically, for example, when the sensor-side communication processing unit 41 of the relay device 151 has received sensor data from a sensor module 1, the sensor-side communication processing unit 41 attaches a time stamp indicating the reception time to the received sensor data, and stores the resultant sensor data into the storage unit 43.

In the standby period Ti (see FIG. 3), for example, the sensor-side communication processing unit 41 is not influenced by interference due to transmission of a radio signal including the aggregated data AD. Thus, the sensor-side communication processing unit 41 can reliably receive the sensor data and store the sensor data into the storage unit 43.

Meanwhile, in the transmission period Tp (see FIG. 3), for example, the sensor-side communication processing unit 41 is influenced by the above-described interference. Thus, the sensor-side communication processing unit 41 fails in receiving the sensor data.

As a result, sensor data received in the standby period Ti is accumulated in the storage unit 43.

FIG. 10 shows an example of the aggregated data created by the higher-order-side communication processing unit of the relay device according to the embodiment of the present disclosure.

With reference to FIG. 10, the higher-order-side communication processing unit 42 transmits a radio signal including sensor data received by the sensor-side communication processing unit 41, to another device, here, another relay device 151 or the management device 161.

Specifically, the higher-order-side communication processing unit 42 can transmit, in an aggregated manner, sensor data that the relay device 151 has received from a plurality of wireless terminal devices 101, for example.

More specifically, the higher-order-side communication processing unit 42 operates according to the schedule shown in FIG. 3, for example.

For example, the higher-order-side communication processing unit 42 sets a cutoff timing in the standby period Ti. The cutoff timing is provided, for example, between the start timing of the standby period Ti and a timing tf, which is 200 milliseconds after the start timing.

The cutoff timing is a timing that is before the timing tf, by not less than the time period required for creation of the aggregated data AD.

For example, when the cutoff timing arrives, the higher-order-side communication processing unit 42 acquires, from the storage unit 43 by use of the time stamps attached to sensor data, sensor data that have been received from the immediately preceding cutoff timing till the present cutoff timing.

For example, in a case where sensor data have been received from a plurality of wireless terminal devices 101 from the immediately preceding cutoff timing till the present cutoff timing, the sensor data to be acquired by the higher-order-side communication processing unit 42 are the sensor data from the plurality of wireless terminal devices 101.

In a case where sensor data from a single wireless terminal device 101 has been received from the immediately preceding cutoff timing till the present cutoff timing, for example, the sensor data to be acquired by the higher-order-side communication processing unit 42 are the sensor data from the single wireless terminal device 101.

When a predetermined condition is satisfied, for example, the higher-order-side communication processing unit 42 thins the sensor data and transmits the resultant sensor data.

More specifically, for example, with respect to two sensor data that have the brother relationship or the twin relationship among the acquired sensor data, the higher-order-side communication processing unit 42 discards either one of the two sensor data.

Specifically, with respect to two short sensor data SSD that have the twin relationship (see FIG. 6), for example, the higher-order-side communication processing unit 42 refers to the time stamps, and discards the data received at the later time out of the two short sensor data SSD.

With respect to long sensor data LSD (see FIG. 5) and short sensor data SSD that have the brother relationship, for example, the higher-order-side communication processing unit 42 discards the short sensor data SSD.

In the sensor data that has not been discarded (hereinafter, also referred to as selected sensor data), for example, when change in a part of the content is small when compared with the part in the sensor data transmitted in the immediately preceding transmission, the higher-order-side communication processing unit 42 deletes the part.

Specifically, for example, when change in the battery voltage value in the selected sensor data is small when compared with the battery voltage value in the sensor data transmitted in the immediately preceding transmission, the higher-order-side communication processing unit 42 deletes the battery voltage value in the selected sensor data.

In addition, for example, when change in the sensor measurement value in the selected sensor data is small when compared with the sensor measurement value in the sensor data transmitted in the immediately preceding transmission, the higher-order-side communication processing unit 42 deletes the sensor measurement value in the selected sensor data.

The higher-order-side communication processing unit 42 adds a destination ID and a transmission source ID to one or a plurality of selected sensor data, thereby creating the aggregated data AD shown in FIG. 10. When there is a plurality of selected sensor data, the higher-order-side communication processing unit 42 may aggregate the plurality of selected data to create a single aggregated data AD, or may create a plurality of aggregated data AD that respectively include the plurality of selected data.

The higher-order-side communication processing unit 42 transmits a radio signal including sensor data and being in a second frequency band. The second frequency band does not overlap the first frequency band, i.e., the entirety of the second frequency band is different from the first frequency band.

Specifically, for the higher-order-side communication processing unit 42, a predetermined transmission channel in a 920 megahertz band (hereinafter, also referred to as relay channel) is set by a user, for example. The relay channel is different from the terminal channel described above.

The respective relay devices 151 are set to transmit radio signals including sensor data so as not to overlap each other in terms of time, for example.

In addition, for example, each relay device 151 is capable of determining whether or not another relay device 151 is transmitting a radio signal, and is capable of determining whether or not the other relay device 151 is receiving a radio signal transmitted from the wireless terminal device 101.

Specifically, the higher-order-side communication processing unit 42 transmits a radio signal including aggregated data AD, in accordance with a CSMA/CA method, for example.

More specifically, for example, at the timing tf (see FIG. 3), the higher-order-side communication processing unit 42 performs carrier sensing regarding the relay channel, and causes the sensor-side communication processing unit 41 to perform carrier sensing regarding the terminal channel, and acquires a result of the carrier sensing.

As a result of the carrier sensing, when the higher-order-side communication processing unit 42 has confirmed that there are no other devices that are performing communication using the relay channel and the terminal channel, the higher-order-side communication processing unit 42 continues, for the above-mentioned backoff time, performing carrier sensing regarding the relay channel and acquiring a result of carrier sensing regarding the terminal channel from the sensor-side communication processing unit 41.

When the higher-order-side communication processing unit 42 has confirmed that there are no other devices that are performing communication using the relay channel and the terminal channel during the backoff time, the higher-order-side communication processing unit 42 transmits aggregated data AD to a device set as the destination ID.

The relay device 151 can resend data to another relay device 151 or the management device 161, for example.

More specifically, for example, when the higher-order-side communication processing unit 42 was not able to receive an ACK, which is a response to the transmitted aggregated data AD, from the transmission destination device of the aggregated data AD, the higher-order-side communication processing unit 42 transmits again the aggregated data AD to the transmission destination device.

With reference to FIG. 1 again, upon receiving the aggregated data AD relayed by the relay device 151, the management device 161 aggregates the sensor measurement value, the battery voltage value, and the like, for each sensor ID, on the basis of the received aggregated data AD.

More specifically, for example, the management device 161 classifies, for each sensor ID and for each sequence number, the sensor data included in the aggregated data AD.

For example, when long sensor data LSD is included in the classified sensor data, the management device 161 associates the software version, the battery voltage value, and the sensor measurement value with the long sensor ID, on the basis of the long sensor data LSD, and stores the associated result.

For example, when the classified sensor data are all short sensor data SSD, the management device 161 acquires the short sensor ID and the sensor measurement value from the short sensor data SSD.

Then, the management device 161 acquires the long sensor ID, the software version, and the battery voltage value from the most recent long sensor data LSD in the past that includes a long sensor ID of which the value of low-order 3 octets is the same as the short sensor ID.

The management device 161 associates the software version and the battery voltage value acquired from the long sensor data LSD and the sensor measurement value acquired from the short sensor data SSD above, with the acquired long sensor ID, and stores the associated result.

APPLICATION EXAMPLE 1

Figure 11:
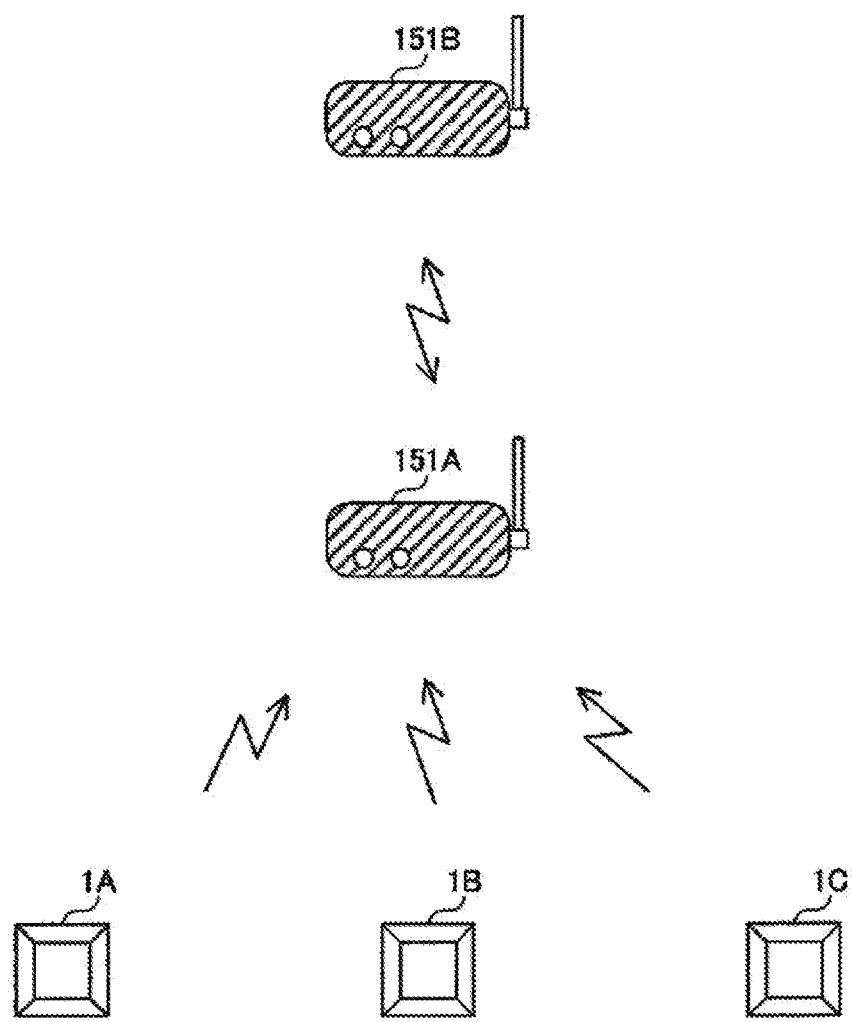
FIG. 11 shows an example of arrangement of the sensor module and the relay device in the wireless sensor system according to the embodiment of the present disclosure.

FIG. 11 shows an example of arrangement of the sensor module and the relay device in the wireless sensor system according to the embodiment of the present disclosure.

With reference to FIG. 11, the relay devices 151A, 151B are arranged so as to be communicable with each other. The relay device 151A is disposed so as to be able to receive radio signals from sensor modules 1A, 1B, 1C, which are sensor modules 1.

Figure 12:
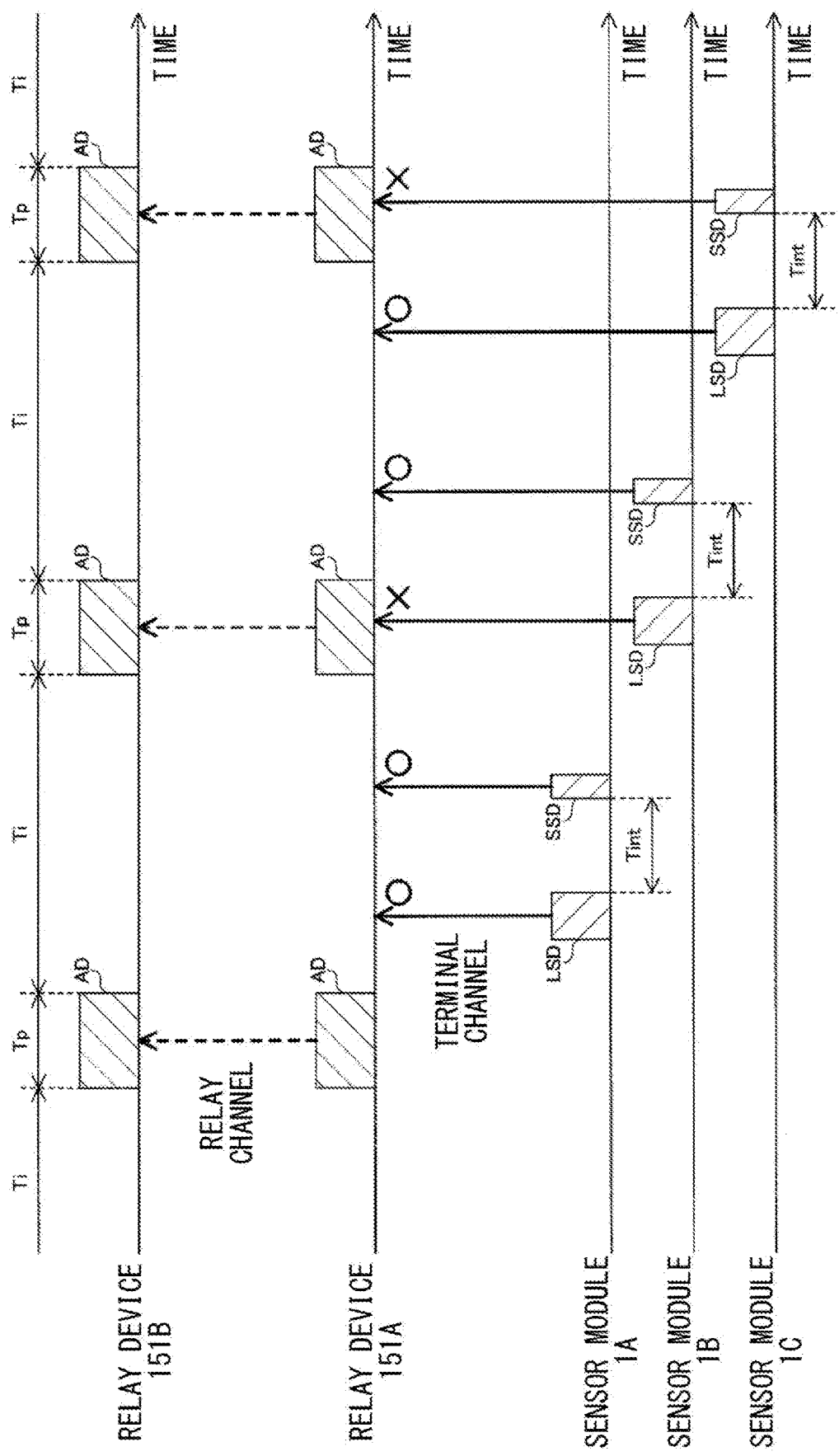
FIG. 12 shows an example of a reception state of sensor data in the arrangement shown in FIG. 11.

FIG. 12 shows an example of a reception state of sensor data in the arrangement shown in FIG. 11.

With reference to FIG. 11 and FIG. 12, according to the schedule shown in FIG. 3, the relay device 151A transmits aggregated data AD to the relay device 151B.

The sensor module 1A broadcasts long sensor data LSD. Then, after the time period Tint has elapsed since the broadcast of the long sensor data LSD, the sensor module 1A broadcasts short sensor data SSD.

Here, both the transmission period of the long sensor data LSD and the transmission period of the short sensor data SSD are included in the standby period Ti. Thus, the relay device 151A succeeds in receiving both the long sensor data LSD and the short sensor data SSD.

The sensor module 1B broadcasts long sensor data LSD after the sensor data has been broadcast by the sensor module 1A. Then, after the time period Tint has elapsed since the broadcast of the long sensor data LSD, the sensor module 1B broadcasts short sensor data SSD.

Here, the transmission period of the long sensor data LSD overlaps the transmission period Tp in the relay device 151A. Thus, the relay device 151A fails in receiving the long sensor data LSD.

Meanwhile, the transmission period of the short sensor data SSD is included in the standby period Ti. Thus, the relay device 151A succeeds in receiving the short sensor data SSD.

The sensor module 1C broadcasts long sensor data LSD after the sensor data has been broadcast by the sensor module 1B. Then, after the time period Tint has elapsed since the broadcast of the long sensor data LSD, the sensor module 1C broadcasts short sensor data SSD.

Here, the transmission period of the long sensor data LSD is included in the standby period Ti. Thus, the relay device 151A succeeds in receiving the long sensor data LSD.

Meanwhile, the transmission period of the short sensor data SSD overlaps the transmission period Tp in the relay device 151A. Thus, the relay device 151A fails in receiving the short sensor data SSD.

As described above, with the configuration in which the sensor module 1 transmits long sensor data LSD and short sensor data SSD at the transmission timings shown in FIG. 8, it is possible to reduce the possibility of the relay device 151A failing in receiving both the long sensor data LSD and the short sensor data SSD.

APPLICATION EXAMPLE 2

Figure 13:
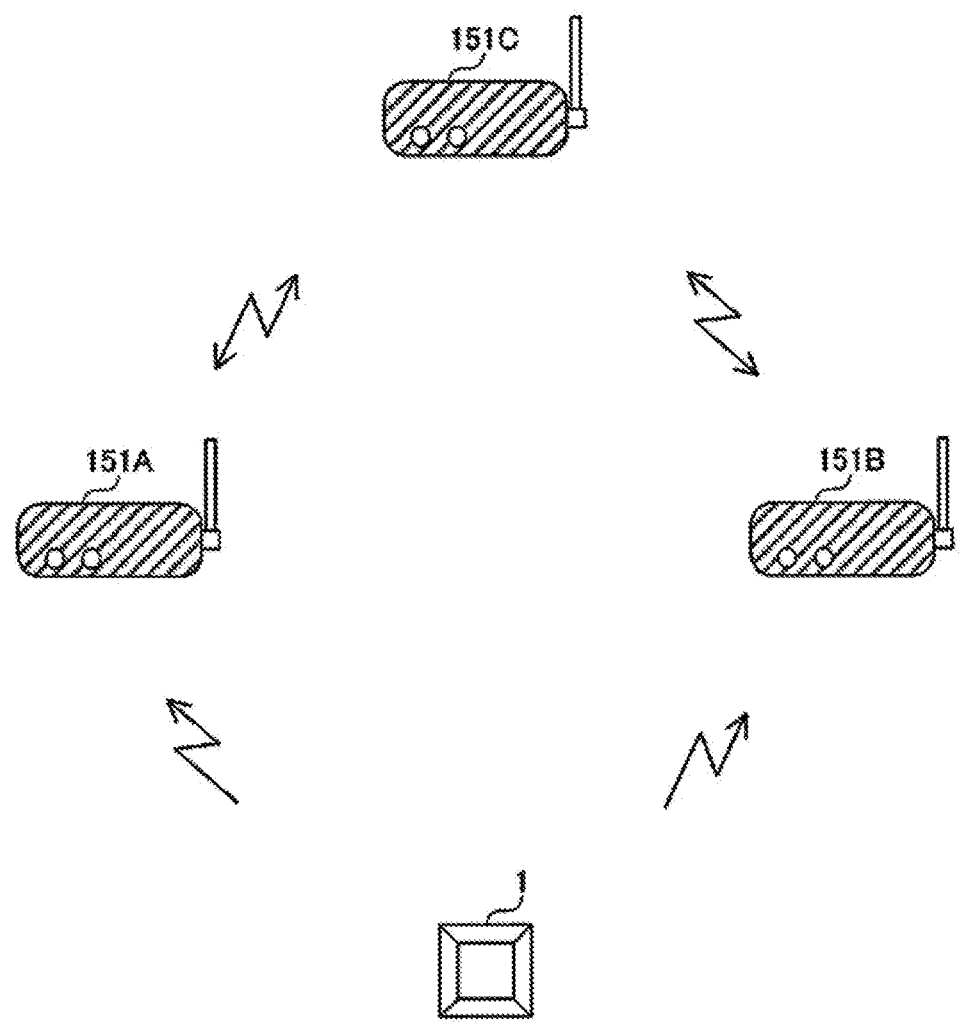
FIG. 13 shows an example of arrangement of the sensor module and the relay device in the wireless sensor system according to the embodiment of the present disclosure.

FIG. 13 shows an example of arrangement of the sensor module and the relay device in the wireless sensor system according to the embodiment of the present disclosure.

With reference to FIG. 13, in this arrangement, a plurality of relay devices 151 are able to receive a radio signal transmitted from the same wireless terminal device 101, for example.

More specifically, the relay device 151C is arranged so as to be communicable with the relay devices 151A, 151B. The relay devices 151A, 151B are arranged so as to be able to receive a radio signal from the sensor module 1.

In this example, the sensor module 1 does not have a function of consecutively transmitting sensor data. Specifically, the sensor module 1 does not consecutively transmit sensor data as shown in FIG. 8, and transmits sensor data once, for one creation of the sensor data.

Figure 14:
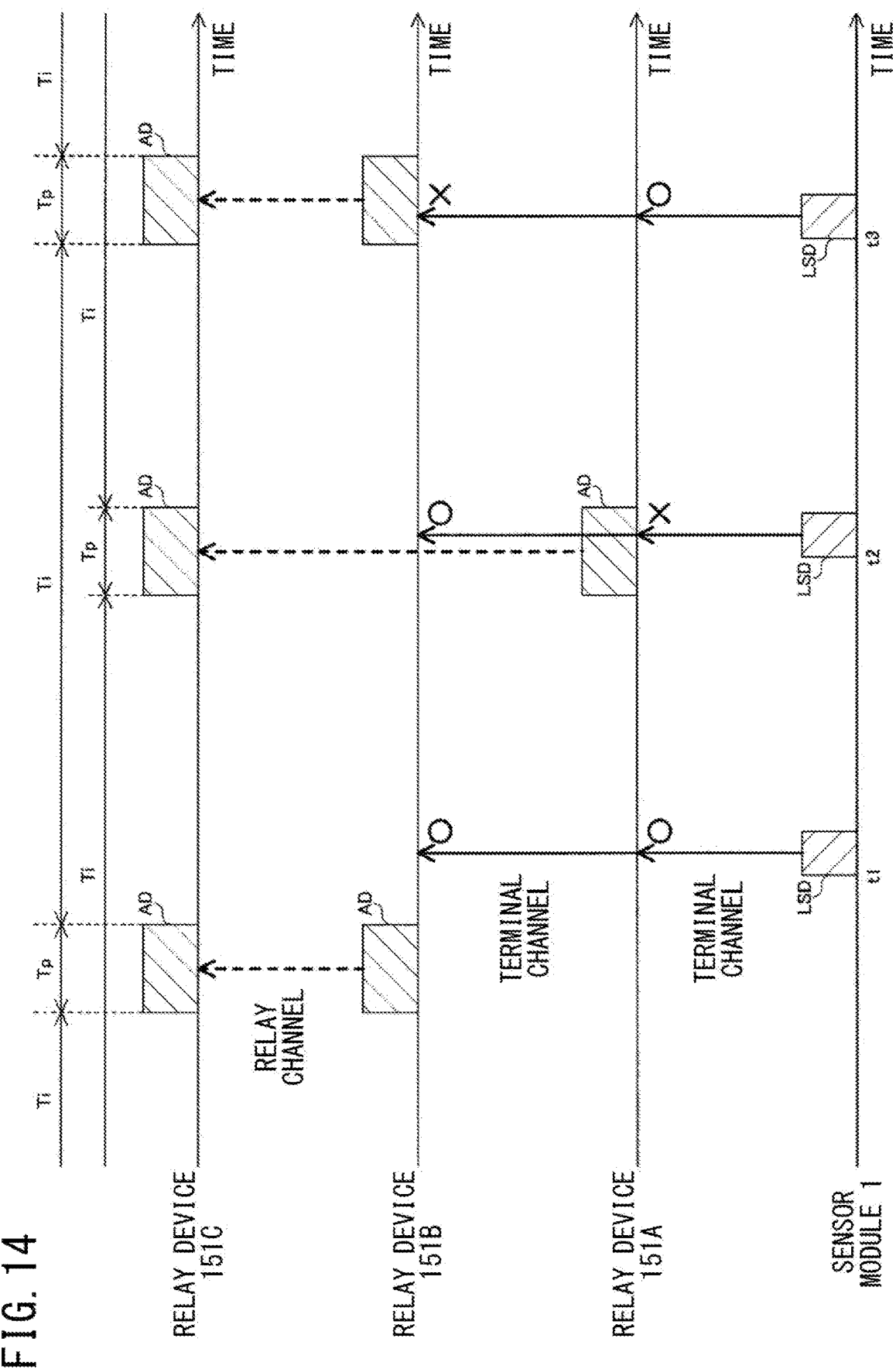
FIG. 14 shows an example of a reception state of sensor data in the arrangement shown in FIG. 13.

FIG. 14 shows an example of a reception state of sensor data in the arrangement shown in FIG. 13.

With reference to FIG. 13 and FIG. 14, according to the schedule shown in FIG. 3, the relay device 151A transmits aggregated data AD to the relay device 151C. Similar to the relay device 151A, the relay device 151B transmits aggregated data AD to the relay device 151C according to the schedule.

The sensor module 1 starts broadcasting long sensor data LSD at a timing t1.

Here, the transmission period of the long sensor data LSD is included in the standby period Ti of the relay device 151A, and is included in the standby period Ti of the relay device 151B. Thus, the relay devices 151A, 151B succeed in receiving the long sensor data LSD.

At a timing t2 after the timing t1, the sensor module 1 starts broadcasting long sensor data LSD.

Here, the transmission period of the long sensor data LSD overlaps the transmission period Tp in the relay device 151A. Thus, the relay device 151A fails in receiving the long sensor data LSD.

Meanwhile, the transmission period of the long sensor data LSD is included in the standby period Ti of the relay device 151B. Thus, the relay device 151B succeeds in receiving the long sensor data LSD.

Then, at a timing t3 after the timing t2, the sensor module 1 starts broadcasting long sensor data LSD.

Here, the transmission period of the long sensor data LSD overlaps the transmission period Tp in the relay device 151B. Thus, the relay device 151B fails in receiving the long sensor data LSD.

Meanwhile, the transmission period of the long sensor data LSD is included in the standby period Ti of the relay device 151A. Thus, the relay device 151A succeeds in receiving the long sensor data LSD.

[Supplement]

Figure 15:
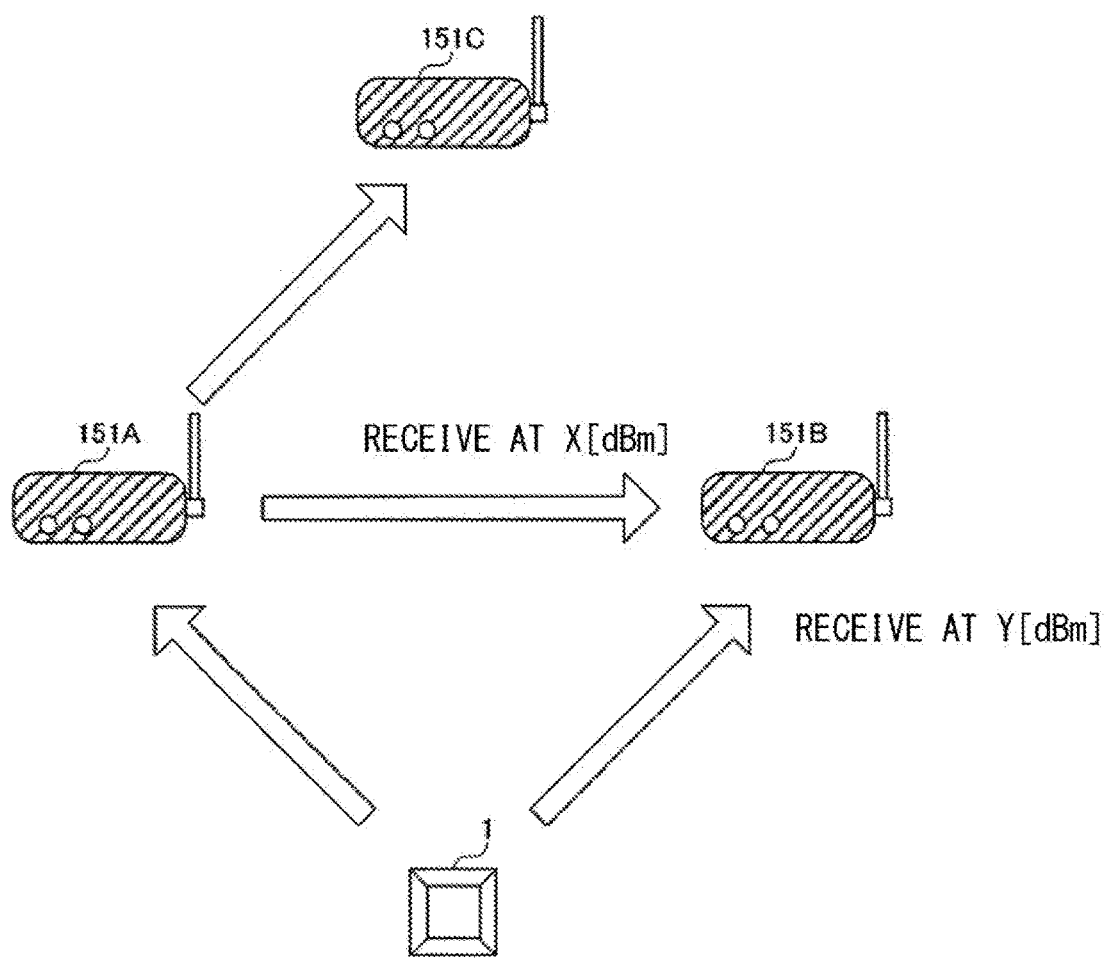
FIG. 15 illustrates interference that occurs in the arrangement shown in FIG. 13.

FIG. 15 illustrates interference that occurs in the arrangement shown in FIG. 13.

With reference to FIG. 15, the radio signal transmitted from the relay device 151A includes aggregated data AD of which the destination is the relay device 151C.

The radio signal transmitted from the sensor module 1 includes long sensor data LSD that should be received and relayed by the relay devices 151A, 151B.

For example, when processing the signal received from the sensor module 1, each relay device 151 attenuates frequency components outside the terminal channel by A [dB] by means of a band pass filter, and then performs signal processing.

The reception power at the relay device 151B of the radio signal from the relay device 151A is X [dBm], for example. The reception power at the relay device 151B of the radio signal from the sensor module 1 is Y [dBm], for example.

The noise floor of the relay device 151B in the transmission period Tp in which the relay device 151A is transmitting a radio signal is $\max((X-A),N1)$.

Here, "max(a,b)" denotes the greater one of a and b. N1 is self noise floor. More specifically, N1 is a noise floor in a period in which the relay device 151A and the sensor module 1 are not transmitting radio signals.

In the relay device 151B, in order for the signal received from the sensor module 1 to exceed the noise floor, $Y > \max((X-A),N1)$ needs to be satisfied.

When the distance between the relay devices 151A and 151B is short, X is increased. In order for at least one of the relay devices 151A and 151B to succeed in receiving the long sensor data LSD as shown in FIG. 14, the following setting is preferred.

That is, a setting is preferable in which the distance between the relay devices 151A and 151B is increased within a range that allows the relay device 151A, 151B to receive the radio signal from the sensor module 1.

When it is difficult to increase the distance between the relay devices 151A and 151B in order to receive the radio signal from the sensor module 1, it is also effective to decrease the transmission power of the relay devices 151A, 151B.

Specifically, for example, in a case where the transmission power of the relay device 151A is 13 [dBm], when the distance between the relay devices 151A and 151B is 30 meters, X is about −60 [dBm] in a line-of-sight environment. When the distance between the relay devices 151A and 151B is 100 meters, X is about −80 [dBm] in a line-of-sight environment.

For example, when self noise floor N1 is −103 [dBm], A is 30 [dB], and the distance between the relay devices 151A and 151B is 30 meters, an arrangement in which Y is greater than −90 [dBm] is desirable.

For example, when self noise floor N1 is −103 [dBm], A is 30 [dB], and the distance between the relay devices 151A and 151B is 100 meters, an arrangement in which Y is greater than −103 [dBm] is desirable.

Figure 16:
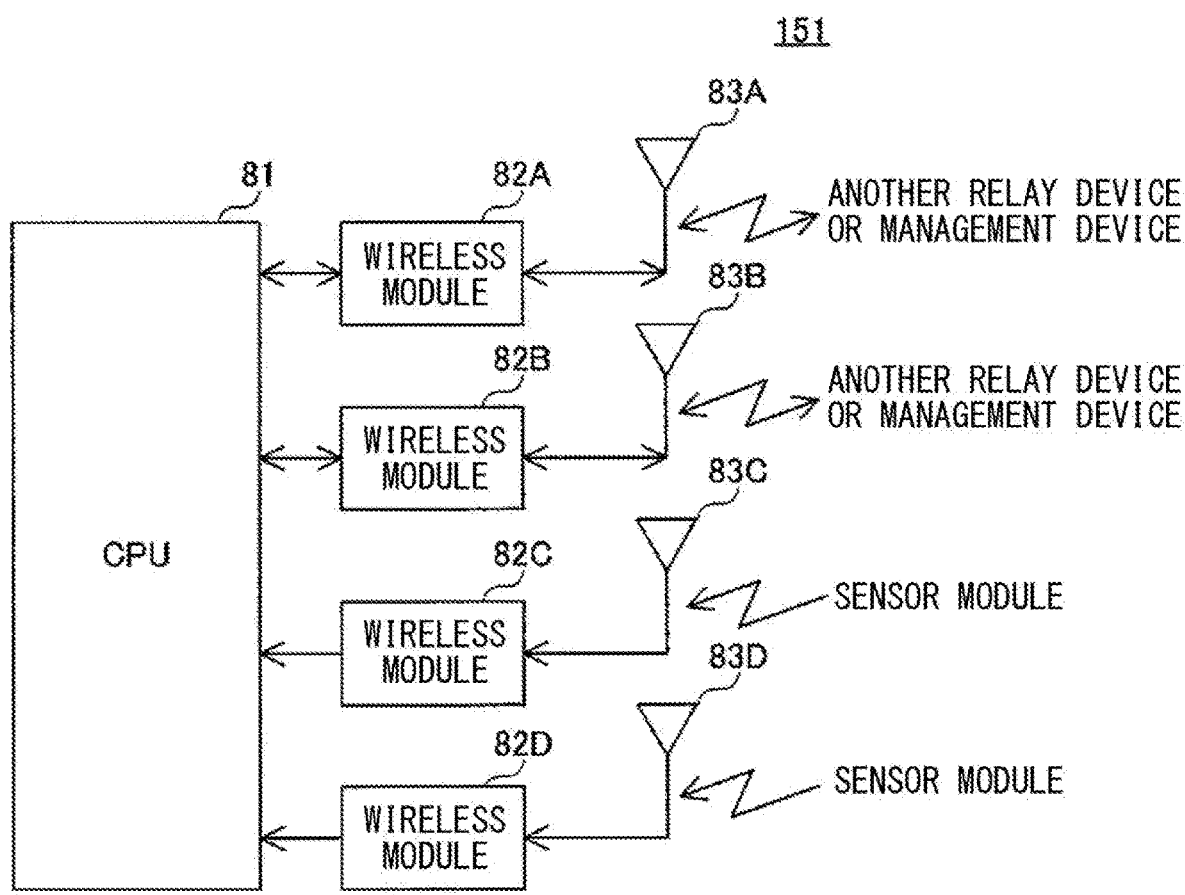
FIG. 16 shows an example of a hardware configuration of the relay device in the wireless sensor system according to the embodiment of the present disclosure.

FIG. 16 shows an example of a hardware configuration of the relay device in the wireless sensor system according to the embodiment of the present disclosure.

With reference to FIG. 16, the relay device 151 includes a CPU (Central Processing Unit) 81, wireless modules 82A, 82B, 82C, 82D, and antennas 83A, 83B, 83C, 83D. Hereinafter, each of the wireless modules 82A, 82B, 82C, 82D may be referred to as a wireless module 82.

The CPU 81 realizes the sensor-side communication processing unit 41 and the higher-order-side communication processing unit 42.

The wireless modules 82A and 82B each receive a radio signal in the relay channel transmitted from another relay device 151, via the corresponding antenna 83A, 83B.

The wireless modules 82C and 82D each receive a radio signal in the terminal channel transmitted from a sensor module 1, via the corresponding antenna 83C, 83D.

Each wireless module 82 outputs sensor data included in the received radio signal, to the CPU 81.

For example, the CPU 81 selects sensor data that has the greater reception power of the received radio signal, out of the sensor data received from the wireless modules 82A and 82B, and stores the selected sensor data into the storage unit 43.

For example, the CPU 81 selects sensor data that has the greater reception power of the received radio signal, out of the sensor data received from the wireless modules 82C and 82D, and stores the selected sensor data into the storage unit 43.

The CPU 81 takes out sensor data from the storage unit 43 in accordance with the transmission timing, and outputs the sensor data to the wireless modules 82A and 82B.

The wireless modules 82A and 82B each generate a radio signal including the sensor data received from the CPU 81, and transmits the generated radio signal to another relay device 151 or the management device 161 via the corresponding antenna 83A, 83B.

Figure 17:
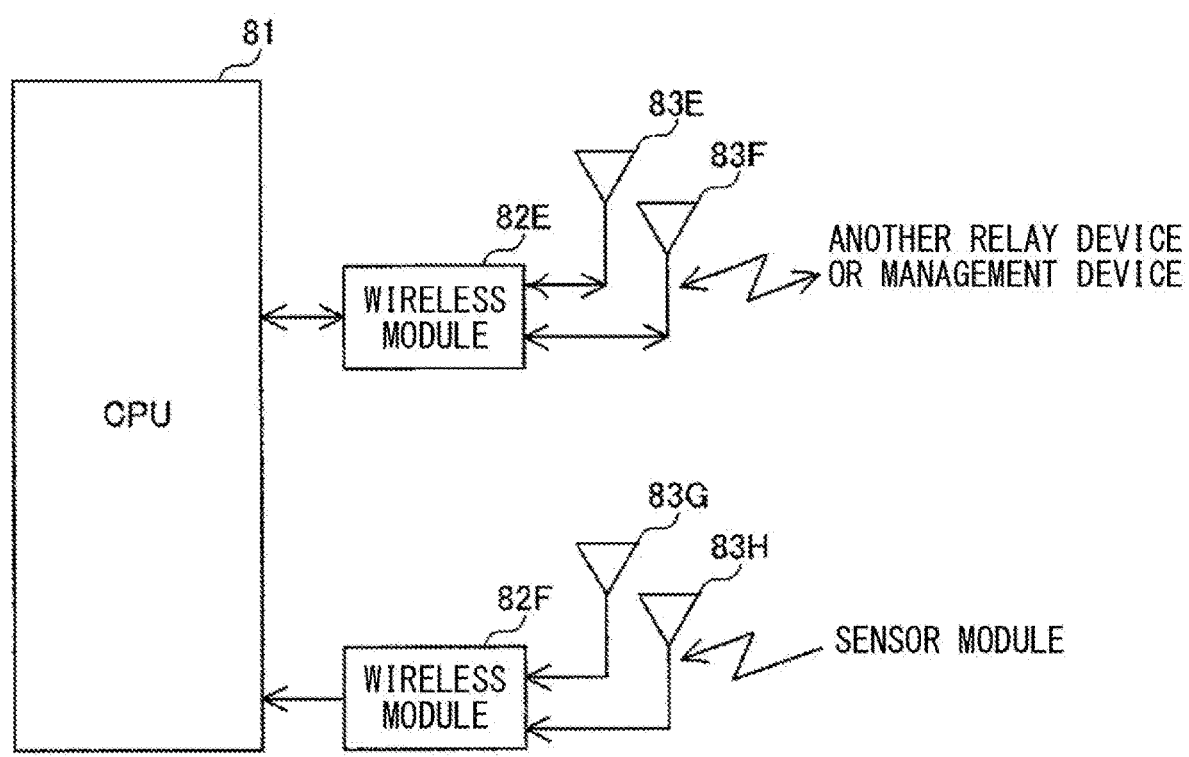
FIG. 17 shows another example of the hardware configuration of the relay device in the wireless sensor system according to the embodiment of the present disclosure.

FIG. 17 shows another example of the hardware configuration of the relay device in the wireless sensor system according to the embodiment of the present disclosure.

With reference to FIG. 17, the relay device 151 includes the CPU 81, wireless modules 82E, 82F, and antennas 83E, 83F, 83G, 83H.

The wireless module 82E receives a radio signal in the relay channel transmitted from another relay device 151, via the corresponding antennas 83E and 83F.

The wireless module 82F receives a radio signal in the terminal channel transmitted from a sensor module 1, via the corresponding antennas 83G and 83H.

For example, the wireless module 82E selects a radio signal that has the greater reception power out of the received radio signals, and outputs sensor data included in the selected radio signal, to the CPU 81.

For example, the wireless module 82F selects a radio signal that has the greater reception power out of the received radio signals, and outputs sensor data included in the selected radio signal, to the CPU 81.

The CPU 81 stores the sensor data received from the wireless module 82E or 82F into the storage unit 43.

The CPU 81 takes out sensor data from the storage unit 43 in accordance with the transmission timing, and outputs the sensor data to the wireless module 82E.

The wireless module 82E generates a radio signal including the sensor data received from the CPU 81, and transmits the generated radio signal to another relay device 151 or the management device 161 via the corresponding antennas 83E and 83F.

[Operation Flow]

Each device in the wireless sensor system 301 includes a computer. An arithmetic processing unit such as a CPU in the computer reads out, from a memory (not shown), a program including part or all of steps in the sequence diagram or flow chart described below, and executes the program. The programs of the plurality of devices can be installed from outside. The programs of the plurality of devices are each distributed in a state of being stored in a storage medium.

Figure 18:
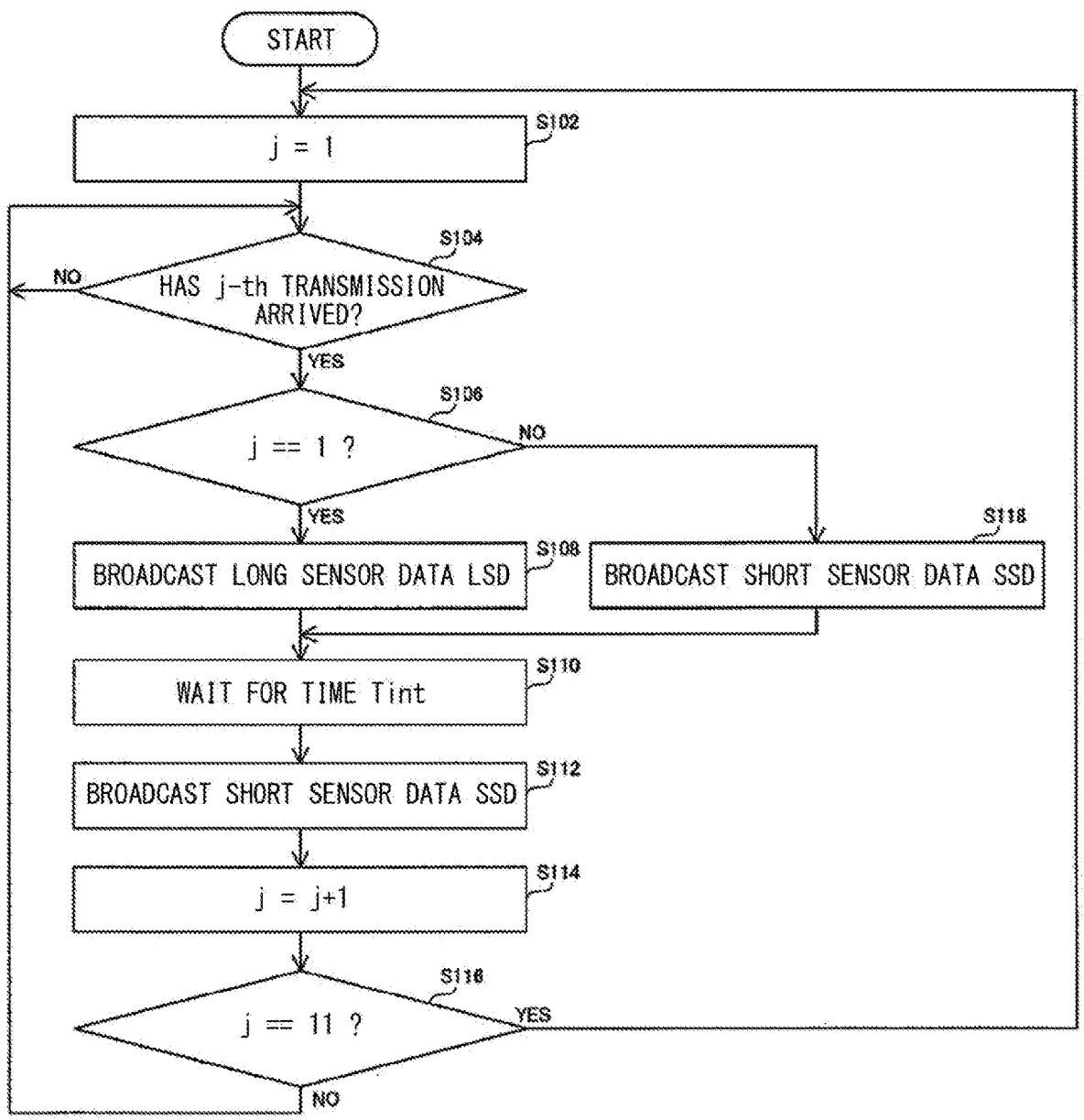
FIG. 18 is a flow chart describing an operation procedure according to which the wireless terminal device in the wireless sensor system according to the embodiment of the present disclosure transmits sensor data.

FIG. 18 is a flow chart describing an operation procedure according to which the wireless terminal device in the wireless sensor system according to the embodiment of the present disclosure transmits sensor data.

With reference to FIG. 18, first, the wireless terminal device 101 initializes an index j to 1 (step S102).

Next, the wireless terminal device 101 waits until the time of the j-th transmission arrives (NO in step S104).

When the time of the j-th transmission arrives (YES in step S104), the wireless terminal device 101 confirms the index j (step S106).

When the index j is 1 (YES in step S106), the wireless terminal device 101 broadcasts long sensor data LSD in the terminal channel (step S108).

Meanwhile, when the index j is not 1 (NO in step S106), the wireless terminal device 101 broadcasts short sensor data SSD in the terminal channel (step S118).

Next, the wireless terminal device 101 waits for the time period Tint (step S110).

Next, the wireless terminal device 101 broadcasts, in the terminal channel, short sensor data SSD that has the brother relationship with the broadcast long sensor data LSD, or short sensor data SSD that has the twin relationship with the broadcast short sensor data SSD (step S112).

Next, the wireless terminal device 101 increments the index j (step S114).

Next, when the incremented index j is 11 (YES in step S116), the wireless terminal device 101 initializes the index j to 1 again (step S102).

Meanwhile, when the incremented index j is not 11 (NO in step S116), the wireless terminal device 101 waits until the time of the j-th transmission arrives (NO in step S104).

Figure 19:
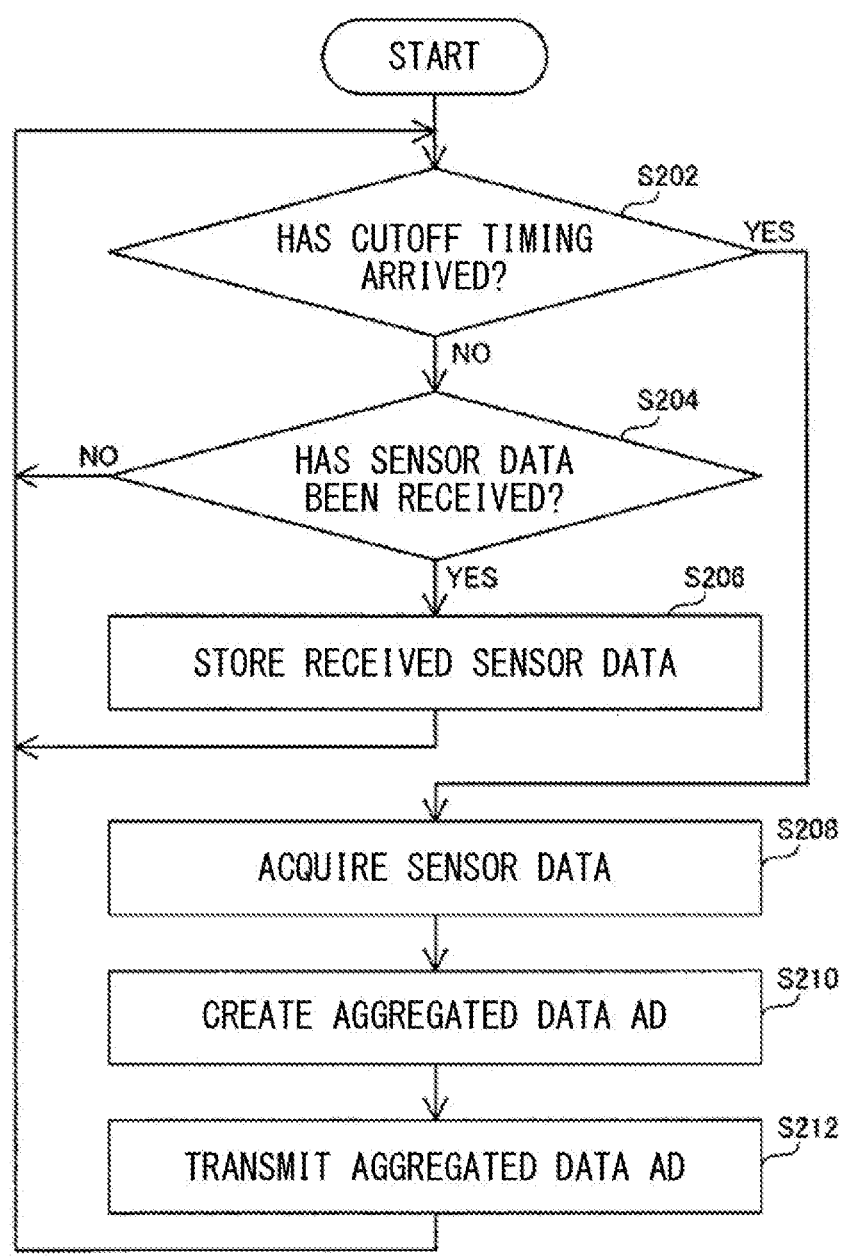
FIG. 19 is a flow chart describing an operation procedure according to which the relay device in the wireless sensor system according to the embodiment of the present disclosure relays sensor data.

FIG. 19 is a flow chart describing an operation procedure according to which the relay device in the wireless sensor system according to the embodiment of the present disclosure relays sensor data.

With reference to FIG. 19, first, the relay device 151 performs the following storing process until a cutoff timing arrives (NO in step S202).

That is, the relay device 151 waits until receiving sensor data (NO in step S204).

When the relay device 151 has received sensor data (YES in step S204), the relay device 151 stores the received sensor data into the storage unit 43 (step S206).

Next, when the cutoff timing has arrived (YES in step S202), the relay device 151 acquires, from the storage unit 43 by use of the time stamps, sensor data that have been received from the immediately preceding cutoff timing till the above cutoff timing (step S208).

Next, the relay device 151 creates aggregated data AD on the basis of the acquired sensor data (step S210).

Next, the relay device 151 transmits, in the relay channel, the created aggregated data AD to another relay device 151 or the management device 161 (step S212).

Next, the relay device 151 performs the storing process until a new cutoff timing arrives (NO in step S202).

In the wireless sensor system according to the embodiment of the present disclosure, the first frequency band and the second frequency band are entirely different from each other. However, the present disclosure is not limited thereto. The first frequency band and the second frequency band may be configured such that some parts do not overlap each other. That is, first frequency band and the second frequency band may be partially different from each other.

The wireless terminal device according to the embodiment of the present disclosure consecutively, twice, transmits sensor data including sensor information having an identical content. However, the present disclosure is not limited thereto. For example, the wireless terminal device 101 may consecutively transmit the above sensor data three times or more.

The wireless terminal device according to the embodiment of the present disclosure transmits a plurality of sensor data that include sensor information having an identical content, within the transmission cycle of the aggregated data AD transmitted by the relay device 151. However, the present disclosure is not limited thereto. For example, the wireless terminal device 101 may transmit a plurality of the above sensor data, within a time period longer than the transmission cycle.

The wireless terminal device according to the embodiment of the present disclosure transmits sensor data that include sensor information having an identical content, so as to be separated from each other by not less than the length of the transmission period Tp. However, the present disclosure is not limited thereto. For example, the wireless terminal device 101 may transmit the above sensor data so as not to be separated from each other by the length of the transmission period Tp or longer.

The wireless terminal device according to the embodiment of the present disclosure transmits a plurality of sensor data that include sensor information having an identical content, within the transmission cycle at a minimum value thereof, here, 200 milliseconds, of the aggregated data AD transmitted by the relay device 151. However, the present disclosure is not limited thereto. For example, the wireless terminal device 101 may transmit a plurality of the above sensor data within a time period longer than 200 milliseconds.

The wireless terminal device according to the embodiment of the present disclosure transmits, in the second transmission, a plurality of sensor data that are obtained by deleting a part of data other than sensor information in a plurality of sensor data transmitted in the first transmission and that include new sensor information. However, the present disclosure is not limited thereto. For example, the wireless terminal device 101 may transmit, in the second transmission, a plurality of sensor data that are obtained by deleting the entirety of data other than sensor information in a plurality of sensor data transmitted in the first transmission and that include new sensor information.

The wireless terminal device according to the embodiment of the present disclosure transmits, in the first transmission, long sensor data LSD and short sensor data SSD having the brother relationship. However, the present disclosure is not limited thereto. For example, the wireless terminal device 101 may transmit two identical long sensor data LSD in the first transmission.

The wireless terminal device according to the embodiment of the present disclosure transmits, in the first transmission, long sensor data LSD and short sensor data SSD having the brother relationship, and transmits, in the second transmission to the 10th transmission, two short sensor data SSD having the twin relationship. However, the present disclosure is not limited thereto. For example, the wireless terminal device 101 may transmit two identical long sensor data LSD in the first transmission to the 10th transmission.

The relay device according to the embodiment of the present disclosure transmits a radio signal that includes aggregated data AD, in accordance with a CSMA/CA method. However, the present disclosure is not limited thereto. For example, the relay device 151 may transmit a radio signal that includes aggregated data AD, in accordance with a TDMA (Time division multiple access) method.

In the wireless sensor system according to the embodiment of the present disclosure, the respective relay devices 151 are set to transmit radio signals including aggregated data AD so as not to overlap each other in terms of time. However, the present disclosure is not limited thereto. For example, a configuration may be employed in which the respective relay devices 151 are allowed to transmit radio signals including aggregated data AD so as to overlap each other in terms of time.

In the wireless sensor system according to the embodiment of the present disclosure, the relay device 151 and the wireless terminal device 101 each have a function of carrier sensing. However, the present disclosure is not limited thereto. At least one of the relay device 151 and the wireless terminal device 101 may be configured not to have the function of carrier sensing.

In the wireless sensor system according to the embodiment of the present disclosure, the arrangement of the sensor module 1 and the relay device 151 are either one of the arrangement shown in FIG. 11 and the arrangement shown in FIG. 13. However, the present disclosure is not limited thereto. In the wireless sensor system 301, the arrangement of the sensor module 1 and the relay device 151 may be an arrangement in which the arrangement shown in FIG. 11 and the arrangement shown in FIG. 13 are mixed.

The relay device according to the embodiment of the present disclosure has a function of resending aggregated data AD. However, the present disclosure is not limited thereto. The relay device 151 may be configured so as not to have the function of resending aggregated data AD.

The relay device according to the embodiment of the present disclosure thins sensor data and transmits the resultant sensor data, when a predetermined condition is satisfied. However, the present disclosure is not limited thereto. The relay device 151 may transmit the sensor data without thinning the sensor data.

The wireless terminal device according to the embodiment of the present disclosure transmits a radio signal through one-way communication. However, the present disclosure is not limited thereto. A configuration may be employed in which the wireless terminal device performs one-way communication in a channel and transmits/receives another piece of information to/from the relay device through two-way communication in another channel.

In the wireless sensor system according to the embodiment of the present disclosure, predetermined transmission channels in a 920 megahertz band are set as the relay channel for the relay device 151 and the terminal channel for the sensor module 1. However, the present disclosure is not limited thereto. In the wireless sensor system 301, predetermined transmission channels in a plurality of frequency bands that are separated from each other to some extent may be set as the relay channel and the terminal channel, respectively.

Specifically, for example, a predetermined transmission channel in a 920 megahertz band may be set as the relay channel for the relay device 151, and a predetermined transmission channel in a 2.4 gigahertz band or a 5 gigahertz band may be set as the terminal channel for the sensor module 1. Alternatively, for example, a predetermined transmission channel in a 2.4 gigahertz band or a 5 gigahertz band may be set as the relay channel for the relay device 151, and a predetermined transmission channel in a 920 megahertz band may be set as the terminal channel for the sensor module 1.

Meanwhile, when a packet is communicated between communication devices via a wireless ad hoc network, the packet is transmitted between the communication devices through a transmission path via one or a plurality of relay devices that relay the packet.

Such multi-hop communication is used not only in a wireless ad hoc network but also in a wired network, and is often used by a single application such as a smart meter for measuring electric power, for example.

In contrast to this, in an M2M system expected to be increasingly used in the future, a configuration is conceivable in which a management device aggregates results of measurements by sensors. In such a configuration, a packet transmitted from a wireless terminal device is transmitted to the management device via one or a plurality of relay devices.

For example, when a large number of wireless terminal devices and relay devices are provided, data loss is increased due to radio-frequency interference between wireless communication devices and relay devices. Thus, it is required to identify the cause for such interference and remove the interference. However, identifying the cause requires elaborate investigations, which results in a lot of work. A technology is required that can reliably transmit data even when a large number of wireless terminal devices and relay devices are provided in a wireless communication network.

In contrast to this, a wireless sensor system according to the embodiment of the present disclosure includes: one or a plurality of wireless terminal devices 101, each wireless terminal device 101 being configured to transmit sensor data including sensor information indicating a result of measurement by the sensor 21; the management device 161; and one or a plurality of relay devices 151, each relay device 151 being configured to transmit sensor data received from the wireless terminal device 101 to the management device 161 or another relay device 151. The wireless terminal device 101 transmits, through one-way communication, a radio signal including sensor data and being in a first frequency band. The relay device 151 transmits a radio signal including the sensor data and being in a second frequency band partially or entirely different from the first frequency band.

In this configuration, the first frequency band used by the wireless terminal device 101 in transmitting a radio signal and the second frequency band used by the relay device 151 in transmitting a radio signal are different from each other. Therefore, even in a wireless sensor system 301 in which time division multiple access cannot be used because the wireless terminal device 101 performs one-way communication and thus time synchronization between the wireless terminal device 101 and the relay device 151 is difficult, it is possible to suppress radio-frequency interference between the relay device 151 and the wireless terminal device 101. Accordingly, even when a large number of wireless terminal devices 101 and relay devices 151 are provided without performing elaborate investigation, increase in data loss due to interference can be prevented. Therefore, in a configuration in which data is transmitted from a wireless terminal device via a relay device, the data can be reliably transmitted.

In the wireless sensor system according to the embodiment of the present disclosure, the wireless terminal device 101 transmits a plurality of sensor data that include sensor information having an identical content, within a transmission cycle of sensor data transmitted by the relay device 151.

Even in a configuration in which the first frequency band and the second frequency band are different from each other, a radio signal transmitted by a relay device 151 sometimes includes a component in the first frequency band, for example. In such a case, if the relay device 151 is to receive a radio signal from a wireless terminal device 101 in a period in which the relay device 151 is transmitting a radio signal, the relay device 151 may fail in receiving the radio signal from the wireless terminal device 101. With the above-described configuration, the possibility of failing in all receptions of the plurality of data from the wireless terminal device 101 due to interference can be reduced. Thus, loss of sensor information can be inhibited.

In the wireless sensor system according to the embodiment of the present disclosure, the wireless terminal device 101 transmits a plurality of sensor data that include sensor information having an identical content, so as to be separated from each other by not less than a transmission time period of sensor data transmitted by the relay device 151.

Even in a configuration in which the first frequency band and the second frequency band are different from each other, a radio signal transmitted by the relay device 151 sometimes includes a component in the first frequency band, for example. In such a case, if the relay device 151 is to receive a radio signal from a wireless terminal device 101 in a period in which the relay device 151 is transmitting a radio signal, the relay device 151 may fail in receiving the radio signal from the wireless terminal device 101. With the above-described configuration, it is possible to reduce the possibility of consecutively failing in receiving the plurality of data from the wireless terminal device 101. Thus, loss of sensor information can be inhibited.

In the wireless sensor system according to the embodiment of the present disclosure, the relay device 151 is capable of transmitting, in an aggregated manner, sensor data received from a plurality of wireless terminal devices 101. Each wireless terminal device 101 transmits a plurality of sensor data that include sensor information having an identical content, so as to be separated from each other by not less than a transmission time period of the sensor data having been aggregated by the relay device 151.

Thus, in the configuration in which communication traffic can be reduced by transmitting, in an aggregated manner, data received from a plurality of wireless terminal devices 101, it is possible to reduce the possibility of consecutively failing in receiving the plurality of data from each wireless terminal device 101. Thus, loss of sensor information can be inhibited.

In the wireless sensor system according to the embodiment of the present disclosure, the transmission cycle is variable. The wireless terminal device 101 transmits a plurality of sensor data that include sensor information having an identical content, within the transmission cycle at a minimum value thereof.

With this configuration, the wireless terminal device 101 can transmit, at least twice, data that include sensor information having an identical content, within the transmission cycle. Thus, it is possible to further reduce the possibility that the relay device 151 fails in all receptions of the plurality of data from the wireless terminal device 101 due to interference.

In the wireless sensor system according to the embodiment of the present disclosure, the wireless terminal device 101 transmits, in a second transmission after a first transmission, a plurality of sensor data that are obtained by deleting a part or an entirety of data other than the sensor information in a plurality of sensor data transmitted in the first transmission and that include new sensor information.

With this configuration, the amount of data transmitted in the second transmission can be reduced. Thus, power consumption in the wireless terminal device 101 can be suppressed. In addition, since the transmission period of each device in the wireless sensor system 301 can be shortened, increase in data loss due to interference can be prevented.

In the wireless sensor system according to the embodiment of the present disclosure, a plurality of relay devices 151 are able to receive a radio signal transmitted from an identical wireless terminal device 101. The respective relay devices 151 are set to transmit the radio signals including the sensor data so as not to overlap each other in terms of time.

Since the distance between a plurality of relay devices 151 that are able to receive a radio signal transmitted from an identical wireless terminal device 101 is short, there is a high possibility that interference occurs between the relay devices 151. With the above-described configuration, occurrence of interference between the plurality of relay devices 151 can be prevented. Thus, increase in data loss due to interference can be prevented.

In the wireless sensor system according to the embodiment of the present disclosure, each relay device 151 is capable of determining whether or not another relay device 151 is transmitting a radio signal, and is capable of determining whether or not the other relay device 151 is receiving a radio signal transmitted from the wireless terminal device 101. Each wireless terminal device 101 is capable of determining whether or not another wireless terminal device 101 is transmitting a radio signal.

Causing a wireless terminal device 101 to have a function of being able to determine whether or not a relay device 151 is transmitting a radio signal requires costs. With the above-described configuration, for example, in a case where a relay device 151 receives data from a plurality of wireless terminal devices 101, the possibility of succeeding in all data receptions can be increased. In addition, for example, in a case where a plurality of relay devices 151 simultaneously receive data from one wireless terminal device 101, the possibility that all the relay devices 151 succeed in receiving the data can be increased.

In the wireless sensor system according to the embodiment of the present disclosure, a wireless terminal device 101 from which a single relay device is able to receive the radio signal transmits a plurality of sensor data that include sensor information having an identical content, within a transmission cycle of sensor data transmitted by the relay device 151.

With this configuration, one relay device 151 can be provided or a plurality of relay devices 151 can be provided, in accordance with whether or not the wireless terminal device 101 has a function of transmitting a plurality of data that include sensor information having an identical content, within the transmission cycle. Accordingly, increase in data loss due to interference can be prevented.

In the wireless sensor system according to the embodiment of the present disclosure, the relay device 151 is capable of resending sensor data to another relay device 151 or the management device 161.

With this configuration, the data can be more reliably transmitted in the wireless sensor system 301.

In the wireless sensor system according to the embodiment of the present disclosure, the relay device 151 thins the sensor data and transmits the resultant sensor data, when a predetermined condition is satisfied.

With this configuration, the transmission period for the relay device 151 can be shortened. Thus, increase in data loss due to interference can be prevented.

In the wireless sensor system according to the embodiment of the present disclosure, the relay device 151 includes a plurality of antennas and is capable of receiving sensor data through each antenna.

Thus, if the configuration in which the relay device 151 can receive data through a plurality of antennas is combined with settings of transmission frequencies of the wireless terminal device 101 and the relay device 151, it is possible to effectively make up for the weakness that data loss tends to occur because the wireless terminal device 101 performs one-way communication. Therefore, in accordance with increase in the number of relay devices 151, the reception performance of radio signals in the entire wireless sensor system 301 is improved, and the data can be more reliably transmitted.

In the wireless terminal device according to the embodiment of the present disclosure, the data creation unit 22 creates sensor data including sensor information indicating a result of measurement by the sensor 21. The transmission processing unit 23 transmits, through one-way communication, a radio signal including the sensor data. The frequency band for the radio signal transmitted by the transmission processing unit 23 is partially or entirely different from the frequency band for a radio signal transmitted by the relay device 151 that relays the sensor data received from the wireless terminal device 101.

In this configuration, the frequency band used by the transmission processing unit 23 in transmitting a radio signal and the frequency band used by the relay device 151 in transmitting a radio signal are different from each other. Therefore, even in a wireless sensor system 301 in which time division multiple access cannot be used because the wireless terminal device 101 performs one-way communication and thus time synchronization between the wireless terminal device 101 and the relay device 151 is difficult, it is possible to suppress radio-frequency interference between the relay device 151 and the wireless terminal device 101. Accordingly, even when a large number of wireless terminal devices 101 and relay devices 151 are provided without performing elaborate investigation, increase in data loss due to interference can be prevented. Therefore, in a configuration in which data is transmitted from a wireless terminal device via a relay device, the data can be reliably transmitted.

In the relay device according to the embodiment of the present disclosure, the sensor-side communication processing unit 41 receives sensor data that includes sensor information indicating a result of measurement by the sensor 21 and that has been transmitted from the wireless terminal device 101 through one-way communication. The higher-order-side communication processing unit 42 transmits a radio signal including the sensor data received by the sensor-side communication processing unit 41, to another device. The frequency band for the radio signal transmitted by the higher-order-side communication processing unit 42 is partially or entirely different from the frequency band for a radio signal including the sensor data transmitted by the wireless terminal device 101.

In this configuration, the frequency band used by the higher-order-side communication processing unit 42 in transmitting a radio signal and the frequency band used by the wireless terminal device 101 in transmitting a radio signal are different from each other. Therefore, even in a wireless sensor system 301 in which time division multiple access cannot be used because the wireless terminal device 101 performs one-way communication and thus time synchronization between the wireless terminal device 101 and the relay device 151 is difficult, it is possible to suppress radio-frequency interference between the relay device 151 and the wireless terminal device 101. Accordingly, even when a large number of wireless terminal devices 101 and relay devices 151 are provided without performing elaborate investigation, increase in data loss due to interference can be prevented. Therefore, in a configuration in which data is transmitted from a wireless terminal device via a relay device, the data can be reliably transmitted.

It should be understood that the above embodiment is merely illustrative and not restrictive in all aspects. The scope of the present disclosure is defined by the scope of the claims rather than the above description, and is intended to include meaning equivalent to the scope of the claims and all modifications within the scope.

The above description includes the features in the additional notes below.

[Additional Note 1]

A wireless sensor system including:

one or a plurality of wireless terminal devices, each wireless terminal device being configured to transmit data including sensor information indicating a result of measurement by a sensor;

a management device; and one or a plurality of relay devices, each relay device being configured to transmit the data received from the wireless terminal device, to the management device or another relay device, wherein the wireless terminal device transmits, through one-way communication, a radio signal including the data and being in a first frequency band, the relay device transmits a radio signal including the data and being in a second frequency band partially or entirely different from the first frequency band, the wireless terminal device transmits, through one-way communication, a radio signal including the data and being in a terminal channel in a 920 megahertz band, and the relay device transmits a radio signal including the data and being in a channel different from the terminal channel in the 920 megahertz band.

[Additional Note 2]

A wireless terminal device including:

a creation unit configured to create data including sensor information indicating a result of measurement by a sensor; and a transmission unit configured to transmit, through one-way communication, a radio signal including the data, wherein a frequency band for the radio signal transmitted by the transmission unit is partially or entirely different from a frequency band for a radio signal transmitted by a relay device configured to relay the data received from the wireless terminal device, the frequency band for the radio signal transmitted by the transmission unit is a frequency band in a terminal channel in a 920 megahertz band, and the frequency band for the radio signal transmitted by the relay device is a frequency band in a channel different from the terminal channel in the 920 megahertz band.

[Additional Note 3]

A relay device including:

a reception unit configured to receive data including sensor information indicating a result of measurement by a sensor, the data having been transmitted from a wireless terminal device through one-way communication; and a transmission unit configured to transmit a radio signal including the data received by the reception unit, to another device, wherein a frequency band for the radio signal transmitted by the transmission unit is partially or entirely different from a frequency band for a radio signal including the data transmitted by the wireless terminal device, the frequency band for the radio signal transmitted by the transmission unit is a frequency band in a relay channel in a 920 megahertz band, and the frequency band for the radio signal transmitted by the wireless terminal device is a frequency band in a channel different from the relay channel in the 920 megahertz band.

REFERENCE SIGNS LIST

1 sensor module
21 sensor
22 data creation unit
23 transmission processing unit (transmission unit)
41 sensor-side communication processing unit (reception unit)
42 higher-order-side communication processing unit (transmission unit)
43 storage unit
101 wireless terminal device
151 relay device
161 management device
301 wireless sensor system

The invention claimed is:

1. A wireless sensor system comprising:
   one or a plurality of wireless terminal devices, each wireless terminal device being configured to transmit data including sensor information indicating a result of measurement by a sensor;
   a management device; and
   one or a plurality of relay devices, each relay device being configured to transmit the data received from the wireless terminal device, to the management device or another relay device, wherein:
   the wireless terminal device transmits, through one-way communication, a radio signal including the data and being in a first frequency band,
   the relay device transmits a radio signal including the data and being in a second frequency band partially or entirely different from the first frequency band, and
   the wireless terminal device transmits a plurality of data that include the sensor information whose contents are identical, so as to be separated from each other by not less than a transmission time period of the data transmitted by the relay device.

2. The wireless sensor system according to claim 1, wherein the wireless terminal device transmits a plurality of data that include the sensor information having an identical content, within a transmission cycle of the data transmitted by the relay device.

3. The wireless sensor system according to claim 1, wherein:
the relay device is capable of transmitting, in an aggregated manner, the data received from a plurality of the wireless terminal devices, and
each wireless terminal device transmits a plurality of data that include the sensor information having an identical content, so as to be separated from each other by not less than a transmission time period of the data having been aggregated by the relay device.

4. The wireless sensor system according to claim 2, wherein
the transmission cycle is variable, and
the wireless terminal device transmits a plurality of data that include the sensor information having an identical content, within the transmission cycle at a minimum value thereof.

5. The wireless sensor system according to claim 2, wherein
the wireless terminal device transmits, in a second transmission after a first transmission, a plurality of data that are obtained by deleting a part or an entirety of data other than the sensor information in a plurality of data transmitted in the first transmission and that include new sensor information.

6. The wireless sensor system according to claim 1, wherein
a plurality of the relay devices are able to receive the radio signal transmitted from an identical wireless terminal device, and
the respective relay devices are set to transmit the radio signals including the data so as not to overlap each other in terms of time.

7. The wireless sensor system according to claim 6, wherein
each relay device is capable of determining whether or not another relay device is transmitting a radio signal, and is capable of determining whether or not the other relay device is receiving a radio signal transmitted from the wireless terminal device, and
each wireless terminal device is capable of determining whether or not another wireless terminal device is transmitting a radio signal.

8. The wireless sensor system according to claim 6, wherein
the wireless terminal device from which a single relay device is able to receive the radio signal transmits a plurality of data that include the sensor information having an identical content, within a transmission cycle of the data transmitted by the relay device.

9. The wireless sensor system according to claim 1, wherein
the relay device is capable of resending the data to another relay device or the management device.

10. The wireless sensor system according to claim 1, wherein
when a predetermined condition is satisfied, the relay device thins the data and transmits the resultant data.

11. The wireless sensor system according to claim 1, wherein
the relay device includes a plurality of antennas, and is capable of receiving the data through each antenna.

12. A wireless terminal device comprising a processor configured to:
create data including sensor information indicating a result of measurement by a sensor; and
transmit, through one-way communication, a radio signal including the data, wherein:
a frequency band for the transmitted radio signal is partially or entirely different from a frequency band for a radio signal transmitted by a relay device configured to relay the data received from the wireless terminal device, and
the processor transmits a plurality of data that include the sensor information whose contents are identical, so as to be separated from each other by not less than a transmission time period of the data transmitted by the relay device.

13. A relay device comprising a processor configured to:
receive data including sensor information indicating a result of measurement by a sensor, the data having been transmitted from a wireless terminal device through one-way communication; and
transmit a radio signal including the received data, to another device, wherein:
a frequency band for the transmitted radio signal is partially or entirely different from a frequency band for a radio signal including the data transmitted by the wireless terminal device, and
the processor receives a plurality of data that include the sensor information whose contents are identical and that has been transmitted from the wireless terminal device so as to be separated from each other by not less than a transmission time period of the data transmitted by the relay device.

14. A non-transitory computer readable storage medium storing a computer program to be used in a wireless terminal device, the computer program causing a computer to function as:
a creation unit configured to create data including sensor information indicating a result of measurement by a sensor; and
a transmission unit configured to transmit, through one-way communication, a radio signal including the data, wherein:
a frequency band for the radio signal transmitted by the transmission unit is partially or entirely different from a frequency band for a radio signal transmitted by a relay device configured to relay the data received from the wireless terminal device, and
the computer program causes the computer to transmit a plurality of data that include the sensor information whose contents are identical, so as to be separated from each other by not less than a transmission time period of the data transmitted by the relay device.

* * * * *